(12) United States Patent
Burg

(10) Patent No.: US 8,763,412 B1
(45) Date of Patent: Jul. 1, 2014

(54) CONTROLLED AND CORRELATED METHOD AND APPARATUS TO LIMIT WATER LOSS FROM FRESH PLANT MATTER DURING HYPOBARIC STORAGE AND TRANSPORT

(71) Applicant: Stanley P. Burg, Miami, FL (US)

(72) Inventor: Stanley P. Burg, Miami, FL (US)

(73) Assignee: American Management Group, LLC, Fort Washington, PA (US)

( * ) Notice: Subject to any disclaimer, the term of this patent is extended or adjusted under 35 U.S.C. 154(b) by 0 days.

(21) Appl. No.: 14/033,651

(22) Filed: Sep. 23, 2013

Related U.S. Application Data

(60) Provisional application No. 61/705,016, filed on Sep. 24, 2012.

(51) Int. Cl.
*F24F 3/16* (2006.01)
(52) U.S. Cl.
USPC .............................................................. 62/78
(58) Field of Classification Search
USPC .................... 62/78, 97, 100, 268; 426/418
See application file for complete search history.

(56) References Cited

U.S. PATENT DOCUMENTS

| | | | | |
|---|---|---|---|---|
| 4,685,305 | A | * | 8/1987 | Burg .................................. 62/78 |
| 4,845,958 | A | * | 7/1989 | Senda et al. ..................... 62/418 |
| 2002/0012728 | A1 | * | 1/2002 | Carlson et al. ................ 426/418 |

* cited by examiner

*Primary Examiner* — Melvin Jones
(74) *Attorney, Agent, or Firm* — Nancy J. Flint, Esq.; Nancy J. Flint, Attorney At Law, P.A.

(57) ABSTRACT

A system and method for hypobaric (low pressure or "LP") storage of plant matter is disclosed. The method is characterized by controlling the correlated conditions of total pressure, oxygen partial pressure, air intake rate, and pumping speed and additionally controlling the pressure with a vacuum regulator operating at a higher temperature than the storage space; storing plant matter in storage boxes which are unable to adsorb water and release the heat of water condensation; shielding the storage boxes from radiation emitted by the storage space's wall; shielding plant matter in the storage boxes from radiation emitted by the box's inner surface; and decreasing the total storage space pressure and steady-state oxygen partial pressure to a minimum value which does not cause low oxygen injury and is optimally effective in extending storage life, reducing metabolic heat and biochemical energy production, and preventing microbial decay in the plant matter.

20 Claims, 5 Drawing Sheets

CONTROLLED AND CORRELATED METHOD AND APPARATUS TO LIMIT WATER LOSS FROM FRESH PLANT MATTER DURING HYPOBARIC STORAGE AND TRANSPORT

RELATED APPLICATIONS

This application claims the benefit of U.S. Provisional Patent Application Ser. No. 61/705,016, filed on Sep. 24, 2012 and titled CONTROLLED AND CORRELATED METHOD AND APPARATUS TO LIMIT WATER LOSS FROM FRESH PLANT MATTER DURING HYPOBARIC STORAGE AND TRANSPORT, which is incorporated herein in its entirety.

FIELD OF THE INVENTION

The invention relates to a system and method for hypobaric (low pressure or "LP") storage of plant matter. The method is characterized by controlling the correlated conditions of total pressure, oxygen partial pressure, air intake rate, and pumping speed, as described in U.S. Pat. Nos. 3,958,028, 4,061,483 and 4,685,305, and additionally controlling the pressure with a vacuum regulator operating at a higher temperature than the storage space; storing plant matter in storage boxes which are unable to adsorb water and release the heat of water condensation; shielding the storage boxes from radiation emitted by the storage space's wall; shielding plant matter in the storage boxes from radiation emitted by the box's inner surface; and decreasing the total storage space pressure and steady-state oxygen partial pressure to a minimum value which does not cause low oxygen injury and is optimally effective in extending storage life, reducing metabolic heat and biochemical energy production, and preventing microbial decay in the plant matter.

BACKGROUND OF THE INVENTION

Water loss usually is the most important factor causing spoilage of one third of the world's fresh horticultural commodities during storage, transport and distribution. The limit to how much water can be lost before fresh plant matter becomes unsalable varies from approximately 3% for lettuce to 10% for cabbage and celery, for most commodities is between 5 to 7%, and weight loss from cut-flowers must be kept below 10% to avoid senescence and a large decrease in vase-life.

Conduction, convection, radiation, and evaporation or condensation modulate the vapor pressure and temperature gradients which develop in systems containing plant matter, and heat transferred by evaporative cooling determines the amount of water the plant matter loses. During storage in a refrigerated space water loss depends on respiratory heat, sometimes augmented or reduced by additional heat transferred to or from the plant matter by convection and radiation. Respiratory heat is immediately available since it is generated within plant matter and does not have to be acquired from the environment.

Water loss by evaporative cooling lowers a stored commodity's temperature unless the latent energy used to change the state of water from liquid to vapor is replaced from a heat source. When stored plant matter remains at a constant temperature if the heat necessary to evaporate the water transpired by the plant matter is less than the respiratory heat the plant matter must transfer heat to the environment, and if the heat used to evaporate transpired water exceeds the respiratory heat the plant matter is acquiring heat from the environment.

Hypobaric storage systems are precisely controlled combinations of low pressure, low temperature, high humidity and ventilation that vastly extend the length of time a perishable commodity remains fresh. Atmospheres are tailored to each perishable item.

A 'metabolic humidification system' operates during every hypobaric storage, evaporating the amount of water from plant matter into the storage atmosphere that is needed to continuously transfer most of the respiratory heat plus any additional heat which the plant matter is receiving from the environment. Convection is ineffective in transferring these heat sources because the convective process is 80 to 90% inhibited at a low storage pressure according to Equations 6 and 7, infra. In LP warehouses and laboratory systems the 'metabolic humidifier' is supplemented by a 'mechanical humidifier' (FIG. 1—A) which warms and evaporates supplementary water (FIG. 1—B) by means of electrical heat (FIG. 1—E) in order to saturate low-pressure air at the selected storage temperature and pressure before said air enters the hypobaric storage space. The advantage gained by using a mechanical humidifier is that a full load, partial load, even a single fruit, vegetable or cut-flower can be stored in a hypobaric warehouse or laboratory apparatus confident that the humidity will always be saturated to minimize commodity water loss.

Super-Saturation and Mist Formation in LP Chambers

At atmospheric pressure and 100% RH respiratory heat warms plant matter above the ambient air's temperature and creates a vapor pressure gradient between the plant matter and ambient air. When convection cools water vapor transpired across the vapor pressure gradient 'heterogeneous' mist formation sometimes occurs on cloud condensation nuclei (CCNs). The international definition of fog is a visibility of less than 1 km (3,300 ft.); mist is a visibility of between 1 km (0.62 miles) and 2 km (1.2 miles); haze extends from 2 to 5 km (1.2 to 3.1 miles). Water droplets have a radius of approximately 5.0 to 7.5 microns ($\mu m$) in dry fog; 10 to 15 $\mu m$ in wet fog; and 30 $\mu m$ in mist. There are approximately 100 to 1000 CCN nuclei per cc of atmospheric air, but within a hypobaric storage space the CCN frequency is decreased proportionate to the reduction in air partial pressure. Only 0.5 to 12 CCNs per cc are present at a storage pressure of 10 to 20 mm Hg, making heterogeneous condensation unlikely to occur. Homogeneous condensation occurs in air lacking CCNs, where droplet formation and growth depends on statistical collisions between water molecules. Homogeneous condensation cannot occur during LP storage because 400 to 600% super-saturation is needed for homogenous condensation of pure water vapor to begin.

Water vapor is likely to condense and form mist if water-saturated air is less than 2.5° C. warmer than a heat exchanger's surface and the air in the stagnant surface layer cools faster than water can be removed by mass transfer. See BROUWERS, H. J. H. (1990) An improved tangency condition for fog formation in cooler-condensers. Int. J. Heat Mass Transfer 34 (8): 2387-2394 ("Brouwers 1990); BROUWERS, H. J. H. (1992) Film models for transport phenomena with fog formation: the fog film model. Int. J. Heat Mass Transfer 35 (1): 13-38 ("Brouwers 1992a); BROUWERS, H. J. H. (1992) A film model for heat and mass transfer with fog formation. Chemical Engineering Science 47 (12): 3023-3036 ("Brouwers 1992b); BROUWERS, H. J. H. and CHESTERS, A. K. (1992) Film models for transport phenomena with fog formation: the classical film model. Int. J. Heat Mass Transfer 35 (1): 1-11 ("Brouwers and Chesters"); SALEH, R. (2004). Webfea-lb.fea.aub.edu.lb/proceedings/2004/SRC-ME-15.pdf ("Saleh, 2004"). A low air velocity, such as that occurring during LP storage, is one of the most important factors causing mist or fog to form on a heat exchanger's surface, and at a water vapor mass fraction between 0.05 and 0.45 condensation may occur and create fog in a stagnant wall film. See KOYAMA, S., YASHUHARA, K. and YARA, T. (2002) Study on mist formation from humid air cooled in a rectangular tube. Engineering Sciences Report Kyushu University 24 (2): 187-193 ("Koyama"); Brouwers, 1990, 1992a, 1992b; Brouwers and Chesters, 1992. During hypobaric storage mist formation is likely to occur in the stagnant gas layer beneath the storage space's roof because the flow is laminar, the temperature difference between plant matter and the wall is less than 2.5° C., and the vapor mass fraction in an empty chamber is 0.46 to 0.56. The vapor mass fraction is even higher when plant matter is present, and the roof is a refrigerated heat-exchange surface. Any mist or fog that forms during hypobaric storage is in equilibrium with the super-saturated low-pressure chamber atmosphere because the equilibrium vapor pressure over a convex mist or fog water droplet is higher than that over a plane surface:

$$e_r = e_\infty \exp[a/r] \quad \text{Equation 1}$$

where $e_r$ (atm.) is the saturation vapor pressure of a water droplet of radius r (μm), $e_\infty$ is the saturation vapor pressure over a plane surface of water (atm.), and a≈3.3×10$^{-7}$/T (meters). The fraction $e_r/e_\infty$ increases with a decrease in droplet radius (Table 1). At a 10 μm radius $e_r/e_\infty$=1.0012 corresponds to 0.12% super-saturation. This is the degree of super-saturation required for a 10 μm radius wet fog water droplet to be in equilibrium with the surrounding water-vapor partial pressure. The droplet will evaporate if super-saturation is below the indicated value for the droplet radius, and increase in size if it is higher.

TABLE 1

Fraction $e_r/e_\infty$ for different sizes of droplets at 0° C.

| r (μm) | $10^{-2}$ | $10^{-1}$ | 10 | 100 |
|---|---|---|---|---|
| $e_r/e_\infty$ | 1.128 | 1.012 | 1.0012 | 1.0001 |

See TIEDKE, M. (1987) Parametrization of non-convective condensation processes. European Centre for Medium-Range Weather Forecasts. Lecture Series. 9 pps.

The heat transfer coefficient for condensation is greatly reduced when non-condensable air is present in the storage atmosphere, even in very small amounts. The air is left behind when water vapor condenses on a cold surface and the incoming condensable water-vapor must diffuse through the air-enriched mixture collected in the vicinity of the condensate surface before reaching and condensing in the stagnant film layer at the cold surface. The presence of non-condensable air adjacent to the condensate surface acts as a thermal resistance barrier to convective heat transfer, reducing the heat-transfer coefficient for condensation by at least an order of magnitude. See ÖZISIK, M. N. (1985) Heat Transfer. A basic approach. McGraw-Hill, New York ("Özisik"); KNUDSON, J. G., BELL, K. J., HOLT, A. D., HOTTEL, H. C., SAROFIM, A. F., STANDIFORD, F. C., STUFLBARG, D., and UHL, V. W. (1964). Heat transmission. In: Crawford, H. B. and Eckes, B. E. (ed). Perry's Chemical Engineer's Handbook. McGraw-Hill, New York, Section 10, pps. 1-68 ("Knudsen"). In a hypobaric system where the vapor mass fraction of water vapor often is larger than 0.5 this effect can allow a significant amount of super-saturated air to escape in the air-change.

Control of Pressure

Vacuum breakers control the pressure in a vacuum chamber by regulating the rate at which atmospheric air enters while the vacuum pump withdraws low-pressure air at a constant rate. Vacuum regulators (FIG. 1—H and FIG. 2—N) maintain a constant process pressure at their inlet by throttling flow from their outlet to the vacuum pump (FIG. 1—N and FIG. 2—P). Breakers and regulators used in hypobaric storage systems are referenced to an absolute total vacuum to eliminate errors caused by fluctuations in a barometric reference pressure, and are able to control the pressure ±0.2 mm HgA.

The pressure in a VivaFresh hypobaric warehouse was measured with a Honeywell ASCX15AN absolute pressure transducer, and controlled by three Clippard EVP proportional solenoid valves acting as an absolute vacuum breaker in response to a proportional integral derivative computer-controlled algorithm. See EP20100267144. The EVP system maintained the pressure ±0.2 mm Hg and had sufficient capacity to serve as a vacuum breaker in both hypobaric warehouses and VacuFresh hypobaric intermodal containers. However, the EVP system's flow capacity is many hundred-fold too small for use as a vacuum regulator in a hypobaric warehouse or VacuFresh intermodal container.

Pressure in hypobaric storage systems also has been controlled by manually balancing needle valves which adjust the inflow of humidified air into a vacuum chamber vs. the rate at which the chamber air/water-vapor mixture is evacuated by the vacuum pump. A static pressure regulating system employed in many Chinese hypobaric storage laboratory systems halts evacuation after the desired pressure has been reached, and intermittently resumes pumping to return the chamber to the set pressure after air has been intentionally reintroduced or has leaked into the chamber. These methods are not referenced to an absolute pressure and are imprecise.

Storage Boxes

Heat transfer ($Q_v$) by water vapor evaporation through the storage box's walls and vent holes to the atmosphere is:

$$\dot{Q}_v = m_v H_v = \left[\frac{A(\Delta p_v) H_v}{r_{v,box}}\right]\left[\frac{M_v}{R_u T}\right] \quad \text{Equation 3}$$

where $m_v$ (kg) is the weight of water (v) evaporated, $H_v$ (kcal/kg) is the latent heat of water evaporation [595.4 kcal/kg@0° C.; 590.2 kcal/kg@10° C.; 584.9 kcal/kg@20° C.], A (m$^2$) is the box's surface area, $M_v$ is the molecular weight of water (=18), T is the temperature (K), $r_{v,box}$ is the box's resistance to water vapor transfer (s/m), $\Delta P_v$ is the water vapor-pressure gradient between the box and chamber air (atm), and the gas constant $R_u$ equals 0.08295 m$^3$·atm/kg·mol·K. The box's transpirational resistance ($r_{box}$) depends on the storage pressure and water-vapor pressure according to Equation 4:

$$r_{box} = r_{box,R} \frac{\ln\left[\frac{p_R - p_{V,O}}{p_R - p_{V,i}}\right]}{\ln\left[\frac{p - p_{V,O}}{p - p_{V,i}}\right]} \quad \text{Equation 4}$$

where $r_{box} = r_{v,box}$ (Equation 3) and $r_{box,R}$ is the box resistance measured at reference pressure $P_R$ (atm) for vapor pressure values $p_{V,i}$ and $p_{V,O}$ inside (i) and outside (o) the box, and p (atm) is the storage pressure. See BURG, S. P. and KOSSON, R. L. (1983) Metabolism, heat transfer and water loss under hypobaric conditions. Lieberman, M. (ed.) Postharvest Physiology and Crop Preservation Plenum Press, New York, pps. 399-424 ("Burg and Kosson, 1983").

The humidity in VacuFresh containers decreases by approximately 50% during a 2-3 week period, and continues to decline because plant matter progressively produces less respiratory heat and therefore transpires less water-vapor. See HARDENBURG, R. E., WATADA, A. E., and WANG, C. L. (1986) The Commercial Storage of Fruits and Vegetables, and Florist and Nursery Stocks. U.S.D.A. Dept. of Agric. Handbook No. 66 (revised) ("Hardenburg"); BURG, S. P. (2004) Postharvest Physiology and Hypobaric Storage of Fresh Produce. CAB International, Wallingford, Oxfordshire, UK, 654 pps ("Burg, 2004"); FIG. 4. The reduction in chamber humidity accelerates evapo-transpiration from the plant matter, causing said matter's temperature to approach the dew-point temperature of low-pressure air in the storage space. Heat then transfers by radiation from the warmer chamber walls to cooler exterior boxes, and to a lesser extent by convection from the warmer chamber walls and atmosphere to cooler interior and exterior boxes. The acquisition of chamber environmental heat by the plant matter induces extra evapo-transpiration of commodity water, and returns the chamber atmosphere to near-saturation. Consequently, in-spite of the plant matter's reduced rate of metabolic heat production, the vacuum pump still evaporates the initial amount of water and the plant matter continues losing water at the initial rate.

Condensation in Cardboard

Sorption reactions generally occur over a short period of time, but if the adsorbed vapor begins to be incorporated into the structure of the sorbent a slowly occurring reaction known as absorption takes place. The difference between water adsorption and absorption is that adsorption is the attraction between the outer surface of a solid particle and water vapor, which leads to water condensation, whereas absorption is the uptake of the condensed water into the physical structure of the particle. The influence of a vacuum and atmospheric pressure on the internal mass transfer of water vapor in electrical-grade cellulosics, including cardboards used for high voltage insulation, has been studied. See KUTS, P. S., PIKUS, J. F. and KALININA, L. S. (1975) Coefficient of internal mass transfer in electrical-grade cellulosics under vacuum and under atmospheric pressure. J. Eng. Physics and Thermophysics 26 (4): 447-452 ("Kuts"). Kuts reported that moisture diffused through cardboard micro- and macropores 20 to 50-fold faster in a vacuum than at atmospheric pressure, and pure water vapor was adsorbed 50 to 150-fold more rapidly. In vacuum an initial steep rise in the rate of moisture adsorption on cardboard was followed by a rapid decrease in the rate of adsorption toward an end-point equilibrium, and eventually the condensed moisture was absorbed into the cardboard structure, lowering the cardboard's strength.

The adsorption and absorption of water which occurs in non-waxed cardboard boxes at a subatmospheric pressure differs from condensation on a heat exchanging surface in that the heat of condensation is released within the cardboard box and a major portion of said heat is transferred to plant matter present in the box. Condensation on a heat exchanging surface transfers the heat of condensation into the surface, allowing the heat to be harmlessly removed. Both types of condensation weaken cardboard boxes since water which condenses under the chamber roof drips back onto cardboard storage boxes. A Mylar® radiation reflecting slip sheet inserted between a non-waxed cardboard box's inner surface and plant matter in the box does not prevent the box from absorbing moisture and losing strength.

Measurements made during rose storages in a Vivafresh hypobaric warehouse (FIG. 4) revealed that water adsorption in non-waxed cardboard boxes rapidly released a large amount of latent heat. The water adsorption increased box weights by 12.7% during the first 14 days of storage, and most of this increase occurred within the initial 5 days. Released latent heat of water condensation transferred by radiation and convection to roses present in the boxes caused two-thirds of the 6.78% evaporative weight loss the roses experienced during a 5 week storage. Respiratory heat was responsible for the remainder of the weight loss, except for 0.24% caused by vacuum cooling the flowers from 4.1 to 2.5° C. during the initial pump-down. After pump-down was completed the release of latent heat from condensed water increased the cardboard's temperature, and its temperature remained warmer than the flowers' temperature until this trend reversed after 12.5 days (FIG. 4). By the 35th day water that had condensed in each cardboard box increased the cardboard's weight by 18%; in another test the cardboard increased in weight by 20.1% during 6 weeks, and in 4 weeks the high storage humidity caused an 18.6% cardboard weight gain regardless of whether a box was empty or filled with roses. By the $14^{th}$ day each cardboard box (specific heat=0.44 cal/g·° C.) had condensed 195.2 g of water, releasing 594 calories of latent heat per gram of condensed water, a total of 115.2 kcal of heat. If this heat was not removed the cardboard's temperature would have increased by 213° C.! The box surface area transferring heat inward to the flowers by radiation and convection was 22.8-fold larger than the surface area radiating heat from one end of each box to the warehouse wall, and 11.4-fold larger than the area transferring heat by outward convection from both ends of the box into the warehouse's low-pressure air. Most of the released latent heat was radiated from the inner surface of the warmer box to the cooler flowers present in the box, while convection transferred a much smaller amount of heat from the box to the flowers since the convective heat transfer coefficient is reduced by 89% at 11.1 mm Hg. See Burg and Kosson, 1983; Equation 7. In another rose storage the latent (specific heat=0.87 kcal/kg·° C.) from 0.6° C. to 3.9° C. within a few days after the Vivafresh warehouse was initially evacuated, but when the warehouse was vented and re-evacuated on the $14^{th}$ day no significant temperature rise occurred in the flowers, indicating that by then water condensation in the cardboard and the attendant release of latent heat had markedly slowed. Measurements of flower weight loss and cardboard weight gain, and visual examinations when the warehouse was vented and opened after 2, 3, 4, 5 and 6 weeks, indicated that water condensation beneath the warehouse roof became evident after 2 weeks. By then the humidity had become super-saturated and condensed moisture was dripping back onto the storage boxes and decreasing their strength. Subsequently a positive outward temperature gradient developed between the flowers and box, and heat began to be transferred by radiation and convection from the flowers to the cardboard, rather than in the reverse direction, while any heat still being generated by water condensing in the cardboard was transferred by radiation and convection from the cardboard to the vacuum chamber's wall and to the low-pressure storage atmosphere. Because the flowers now were the warmest objects in the storage space they no longer acquired heat from the cardboard or any other environmental source. Only metabolic heat was being removed by evaporative cooling, and since the production of respiratory heat decreases during storage (Hardenburg, 1986) the flower and box temperatures progressively declined (FIG. 4). This thermodynamic analysis was verified by comparing rose storage in non-waxed cardboard boxes vs. storage in equally sized plastic storage boxes that were unable to condense water. The floral weight loss was 5.0% during 15 days in non-waxed cardboard boxes and 1.57% in plastic boxes, including a 0.24% weight loss caused by vacuum-cooling during the initial pump-down. The entire commodity weight loss caused by water condensation in non-waxed cardboard was eliminated in plastic boxes, thereby reducing the water loss from plant matter to the amount needed to transfer respiratory heat. All subsequent commercial flower storages in the Vivafresh warehouse have been carried out in plastic boxes to minimize water loss. Mylar® typically is 69 to 80% effective in blocking radiation (Table 2), and a Mylar® liner situated between a non-waxed cardboard box's inner surface and roses present in the box was 70% effective in reducing the rose weight loss caused by released heat of water condensation. During hypobaric storage the cardboard 'sleeves' used commercially to protect roses during distribution at atmospheric pressure caused the same drying effect as non-waxed cardboard boxes. Roses protected with cardboard sleeves and stored in plastic boxes for 40 days in a laboratory vacuum chamber at 11 mm Hg, 2° C., lost 15% of their water and the weight of the cardboard sleeve's increased by 18%.

Controlling Air-Flow into and Through the Storage Space

In VacFresh intermodal containers an air mover, specifically a pneumatic air horn, mounted in an under-shelf duct accommodates the air-changes introduced by the entire range of pumping speeds and pressures recommended for different types of plant matter. See Burg, 2004; U.S. Pat. No. 4,685,305. Incoming air enters a concentric manifold chamber surrounding the pneumatic air horn's throat where jets located symmetrically around the concentric chamber are positioned to expand air into a reaction zone down-stream of the throat in which high-velocity air imparts its energy to slower moving air, accelerating the slower moving air's flow, in turn drawing more air through the throat into the reaction zone. The jets must discharge at supersonic velocity (turbulent flow) for the pneumatic air horn to operate at maximum efficiency. Said critical flow occurs when the upstream pressure is at least 1.9 times larger than the pressure downstream of the pneumatic air horns jets. The VacuFresh pneumatic air horn has been specially designed with jet orifices which satisfy this requirement when the vacuum pump operates at greater than 27% of its maximum capacity at 50 Hz.

Condensation Inside a Hypobaric Storage Space

When super-saturated air. mist or fog is evacuated from an LP storage space in which the pressure is controlled by a vacuum breaker operating at 25° C., the mist and fog vaporizes and the resultant air/water-vapor mixture warms to close to 25° C., elevating the pressure upstream of the vacuum pump. The pressure rise feeds-back into the storage space, and the vacuum breaker senses the increase in chamber pressure through an external register and responds by reducing the flow of atmospheric air into the storage space, thereby having the adverse effect of increasing the degree of super-saturation in the storage space. The pressure in a super-saturated LP system controlled by a vacuum breaker can only equilibrate when all excess water vapor condenses inside the storage space. Water vapor evapo-transpired from plant matter stored in plastic boxes does not continuously condense and liquid water accumulates during tests lasting 8 weeks when air saturated at the storage pressure and temperature by a mechanical humidifier continuously enters and flows through a leak-tight 13° C. laboratory chamber in which the pressure is controlled by an absolute vacuum regulator operating at 25° C. Under identical conditions large amounts of water vapor continuously condense and liquid water accumulates in the same storage space when the pressure is controlled with a vacuum breaker operating at 25° C.

Due to the low heat capacity of the air/water-vapor mixture present in an LP storage space, if super-saturated chamber air, mist or fog escapes in the air-change, this mixture's temperature rapidly increases from a storage temperature between 0 and 16° C., to a higher temperature as the mixture flows through a 25° C. heat transferring conduit (FIG. 1—K and FIG. 2—H) leading to a vacuum regulator operating at 25° C. (FIG. 1—H, FIG. 2—N, FIG. 3). Vaporization of the mist or fog, and gas and vapor expansion at the higher temperature increases the pressure of the air/water-vapor mixture while at the same time the mixture's RH decreases at the higher temperature. The elevated pressure feeds-back and raises the pressure in the storage space, and a vacuum regulator senses the rise in pressure through an external register connected to the storage space (FIG. 1—L and FIG. 3—J). The regulator responds by enhancing the pumping speed to off-set the pressure increase. Water vapor continues entering the storage space at the initial rate determined by the humidification system's wattage setting and a flow-regulating device (FIG. 1—D and FIG. 2—M), and the system equilibrates when the increased flow of air and moisture from the chamber to the vacuum regulator and vacuum pump decreases the chamber's RH from super-saturation to saturation, thereby preventing condensation from occurring. When 31.1 kg of mangoes were stored at 13° C. flowing one saturated incoming 15 mm Hg air-change per hour into a 170 liter LP chamber, a pressure regulator increased the pumping speed and rate of air-flow from the LP chamber to the vacuum pump, causing the same mass of air to exhaust from the vacuum pump 1.54-fold faster than said mass was entering the storage space (Table 3).

Previous Designs of Hypobaric Chambers

Attempts have been made to control the RH near saturation in Western and Chinese laboratory chambers in response to a humidity sensor, and a commercial hypobaric warehouse design envisioned a similar arrangement. See Li, W-X and ZHANG, M (2006) Effect of three-stage hypobaric storage on cell wall components, texture, and cell structure of green asparagus. J. Food Eng. 77 (1): 112-118 ("Li"); Li, W-X, ZHANG, M. andYU. H-Q (2004) Study on hypobaric storage of *Asparagus officinalis*. Wuxi University of Light Industry 23 (6): 38-42 (in Chinese) ("Li & Zhang"); TOLLE, W. E. (1969) Hypobaric storage of mature green tomatoes. USDA Agr. Research Rept. 842: pps. 1-9 ("Tolle 1969"); TOLLE, W. E. (1972) Hypobaric storage of fresh produce. Yearbook of United Fresh Fruit & Vegetable Association (July): pps. 27, 28, 33, 34, 36, 38, and 43 ("Tolle 1972"); ANON. 1974. A feasibility study of low pressure storage. Horticultural Science Dept. and School of Engineering, University of Guelph, Ontario, Canada, 46 pps ("Anon"). When Tolle stored strawberries and tomatoes in an LP apparatus without humidification "drying of the fruits increased at faster air-flow rates even though electro-sensors recorded the same high relative humidity irrespective of the airflow rate." Lougheed reported that apples rapidly desiccated even though a humidity sensor indicated that rarified air in the chamber was nearly saturated. See LOUGHEED, E. C., MURR, D. P. and BERARD, L. (1978) Low-pressure storage of horticultural crops. HortScience 13(1): 21-27 ("Lougheed"). These anomalies were explained by tests carried out in a hypobaric intermodal container in which the humidity was measured and controlled by a bureau of standards chilled-mirror dew-point sensor. Whenever the relative humidity decreased below the sensor's highest reliable set-point a water boiler's electric immersion heater was energized to inject cold-steam into the low-pressure air-change entering the storage space. Without cargo present the system worked as envisioned, but after the intermodal container was loaded with 30,000 pounds of plant matter the humidification heater failed to energize because water vapor diffuses extremely rapidly across a very small vapor-pressure gradient at a low atmospheric pressure (FIG. 5A) and metabolic heat evaporated cellular water so rapidly through the plant matter's enormous surface area that the plant matter's temperature decreased slightly and approached the chamber air's dew-point temperature, causing heat to radiate and transfer by convection from the warmer container walls to the cooler plant matter. Respiratory heat and the acquired heat evaporated enough water from the plant matter to elevate the chamber RH above the humidity sensor's setpoint, preventing the boiler's water heater from energizing, causing the plant matter to lose excessive water. A humidity sensor cannot reliably distinguish between water vapor generated from a humidification boiler in response to electrical heat vs. water vapor generated from plant matter in response to metabolic and environmental heat.

The mechanical humidification step described in U.S. Pat. Nos. 3,958,028, 4,061,483, 4,685,305, and US2010/0267144, continuously saturates the air in a hypobaric storage space, and the stored plant matter responds by increasing in temperature until a vapor pressure gradient is established that evapo-transpires sufficient water vapor to transfer most of the respiratory heat, thereby super-saturating the chamber atmosphere. See BURG, S. P. and ZHENG, Z. (2009) Experimental errors in laboratory hypobaric research and answer [A]. Chinese Assoc. Refrigeration [C] ("Burg, 2009"). For a perfect gas the buoyancy force ($\beta$) for natural convection is inversely related to the gas's temperature, but because in biological systems plant matter transfers heat by evapo-transpiration there is an additional buoyancy term due to the low molecular weight of the evaporated water vapor ($M_V$=18) compared to air ($M_A$=28.9). At atmospheric pressure and a 0 to 16° C. storage temperature, the buoyancy caused by water vapor's low molecular weight can be disregarded because water vapor represents an extremely small mole fraction of the air/water-vapor mixture present in the storage space, but water vapor's buoyancy is highly significant during hypobaric storage since water vapor constitutes upwards of 50% of the air/water-vapor mixture. See Burg and Kosson, 1983. Water vapor's high buoyancy rapidly lifts transpired water-vapor to the storage space's roof where heat is transferred from the air/water-vapor mixture into the roof since it serves as a heat exchanger in the refrigeration system. This heat transfer process caused condensation to occur beneath the roof in hypobaric warehouses and intermodal containers, and under the lids of glass vacuum desiccators and steel vacuum drums, on transparent viewing plates in steel laboratory vacuum chambers, and in leak-tight aluminum vacuum chambers when they were incubated in refrigerated laboratory cold-rooms. In commercial hypobaric systems the condensed water drips onto cardboard storage boxes and is absorbed into their structure, weakening the boxes. Bracing had to be installed and storage boxes covered with waterproof means to prevent box stacks from collapsing in hypobaric intermodal containers and warehouses. Microbial growth is promoted if condensed water wets the plant matter's surface, and surface water on plant matter is likely to be vacuum infiltrated into said matter's intercellular air spaces when the storage space is vented and opened, causing irreparable damage to the plant matter.

Flowing low-pressure saturated air-changes through a laboratory LP chamber failed to elevate the RH above 85% during 7 days when the chamber contained empty non-waxed cardboard boxes. See EP20100267144. The RH immediately increased to 99.5% when the boxes were removed. The non-waxed cardboard boxes were reducing the RH by adsorbing water. Water adsorption by cardboard is well known, and cardboard boxes often have been waxed to prevent water condensation (see Hardenburg) and a loss of box strength during high RH export shipments in refrigerated intermodal containers and storages in high humidity refrigerated warehouses. Because waxed cardboard boxes cannot be recycled they have been banned in Europe and replaced with water-resistant recyclable paperboard boxes ('Solidboard') capable of being hydrocooled without absorbing water and losing strength, and by plastic collapsible and returnable boxes. Cardboard boxes such as International Paper's Climaseries or Interstate Container's Greencoat™ are impregnated with wax alternatives making them recyclable, compostable, re-pulpable, water-proof or water-resistant, and suitable replacements for waxed cardboard boxes.

EP20100267144 suggests that specialized packing boxes unable to absorb water can be used as 'an optional alternate feature' to prevent non-waxed cardboard boxes from absorbing enough water to reduce the humidity and increase water loss from plant matter during LP storage, but when roses were stored in non-waxed cardboard boxes inside an LP warehouse through which two water-saturated air-changes per hour were flowing, the chamber humidity reached 96% immediately after pump-down was completed, within 36 hours the RH increased to 98.5%, and soon thereafter water began to condense under the chamber roof (FIG. 4). Cardboard's ability to lower the humidity was overwhelmed by water vapor transpired from the roses.

In 1979 Grumman Corp. and Armour & Co. were awarded the U.S. Food Technology Industrial Achievement award for developing the hypobaric transportation and storage system (see Mermelstein, N. H., 1979, Hypobaric transport and storage of fresh meats and produce earns IFT Food Technology Industrial Achievement Award. Food Tech. 33; 32-35; 38-40) ("Mermelstein"). Soon thereafter hypobaric research in the West came to an abrupt halt because peer-reviewed academic publications presented data ostensibly demonstrating that LP induced 'stress' ethylene production, failed to prevent ethylene action, accelerated diffusive water loss, and out-gassed flavor and aroma volatile organic compounds (VOCs) from vegetables and ripening fruits. Subsequent publications by BURG, S. P. and ZHENG, Z. (2007) Summary of hypobaric research in China and the West. Journal of Refrigeration 28 (2): 1-7 (in Chinese) ("Burg & Zheng, 2007") and BURG, S. P. and ZHENG, X., 2009), Experimental errors in laboratory hypobaric research and answer. Chinese Assoc. Refrigeration ("Burg and Zheng 2009") demonstrated that Western literature critical of hypobaric storage was based on experimental errors, including chamber leakage (FIG. 5B), humidification at atmospheric instead of a low pressure, cold spots on the LP chamber's surface due to non-precise temperature control, a poor understanding of autocatalytic and stress-ethylene production, an incorrect assumption that ethylene binding to its receptor is irreversible, a gross underestimate of the ethylene concentration needed to stimulate fruit ripening, failure to distinguish between low $O_2$ and low-pressure effects, and allowing respiratory $O_2$ consumption to inhibit flavor and aroma biosynthesis by creating an anaerobic condition in a static or nearly static LP system. More than 60 research papers describing favorable hypobaric storage results subsequently were published in China, and in 2010 the Science and Technology Committee of Shanghai issued a grant to develop a hypobaric warehouse, in 2011 the Science and Technology Committee of the People's Republic of China provided funding to build the first hypobaric storage unit for use on-board warships, and in 2013 the first Chinese hypobaric warehouse was sold.

U.S. Pat. No. 3,333,967, now reissue Pat. No. Re 28,995, to Burg and titled Method for Storing Fruit, the contents of which are herein incorporated by reference in their entirety, discloses a method for preserving mature but less than fully ripe fruits which produce ethylene and are ripened thereby, by use of hypobaric conditions of about 100 to 400 mm HgA pressure in a flowing stream of humidified, nearly water-saturated air.

U.S. Pat. Nos. 3,958,028 and 4,061,483, to Burg and titled Low Temperature Hypobaric Storage Of Metabolically Active Matter, the contents of which are herein incorporated by reference in their entirety, disclose a method of overcoming evaporative cooling and providing a constant high relative humidity in a hypobaric storage space. Incoming expanded atmospheric air is preconditioned to the pressure and temperature inside the storage space, and thereafter the air is contacted with a body of heated water to saturate the storage space atmosphere. A relatively broad spectrum of correlated conditions is disclosed that is operational in preserving metabolically active matter at pressures ranging from 4 to 400 mm HgA.

U.S. Pat. No. 4,685,305 to Burg and titled Hypobaric Storage Of Respiring Plant Matter Without Supplementary Humidification, the contents of which are herein incorporated by reference in their entirety, disclosed a method of preserving respiring plant matter without the step of humidifying the storage atmosphere by contacting the atmosphere with a supplementary body of heated water, characterized by storage at controlled and correlated conditions of temperature, atmospheric pressure, evacuation rate, air recirculation rate and air intake rate, and by the dependence of each set of correlated conditions upon the weight, respiration rate, and type of plant matter.

U.S. Pat. No. 4,655,048, to Burg and titled Hypobaric Storage Of Non-Respiring Animal Matter Without Supplementary Humidification, the contents of which are herein incorporated by reference in their entirety, discloses hypobaric storage of non-respiring animal matter without supplementary humidification.

Canadian Patent No. 997,532, to Burg and Burg and titled Prevention Of Microbial Growth By Treatment With Hypochlorous Acid Vapor, the contents of which are herein incorporated by reference in their entirety, discloses sodium or potassium salts of hypochlorite and carbonate that are added to humidification water of a hypobaric storage space at concentrations which cause $CO_2$ present in incoming low-pressure air-change to continuously release a narrow range of hypochlorous acid vapor concentrations, thus killing molds and bacteria without injuring plant matter stored therein or leaving a harmful residue on the plant matter.

EP20100267144 to Burg, R. Bothel, and J. Bothel and titled Systems and Methods for Controlled Pervaporation in Horticultural Cellular Tissue, the contents of which are herein incorporated by reference in their entirety, discloses an apparatus and process providing the storage conditions as specified in U.S. Pat. No. 4,061,483 by use of a jacketed refrigeration system and secondary coolant to control a hypobaric intermodal container's temperature, as described in U.S. Pat. Nos. 4,061,483, 4,655,048, and 4,685,305, humidifying the atmosphere in the container by plant matter evapo-transpiration, as described in U.S. Pat. Nos. 4,655,048 and 4,685,305. In another embodiment, a steel hypobaric 'Vivafresh' warehouse is disclosed that is located inside an insulated space, wherein the temperature is independently controlled by a forced-air cooling system, as revealed in prior art describing a corten steel hypobaric storage space installed inside an independently controlled forced-air refrigerated enclosure. See Burg, S. P., 2004, Postharvest Physiology and Hypobaric Storage of Fresh Produce. CAB Int'l, Wallingford, Oxfordshire, UK, 654 pps. ("Burg 2004"). A computer software program adjusts the heater wattage in the Vivafresh warehouse's humidification boiler to saturate low-pressure incoming air-changes by contact with heated water, as described in U.S. Pat. Nos. 3,958,028 and 4,061,483, and the computer program also controls the storage pressure by means of three Clippard EVP series proportional solenoid control valves actuated in an algorithm responsive to an absolute pressure transducer.

Even when all known causes of excessive water loss have been eliminated hypobaric storages performed in commercial warehouses and during shipments carried out in LP intermodal containers have resulted in weight losses from fresh plant matter in excess of the amount predicted by laws describing heat exchange and mass transport at a low pressure, The weight loss problem needed to be better understood before the hypobaric method could be successfully developed into a commercial process for storing and transporting plant matter.

SUMMARY OF THE INVENTION

The hypobaric, or low pressure (LP), preservation of respiring plant matter is hereby described using a method and apparatus that prevent water from condensing beneath the vacuum chamber's roof, inside storage boxes, or in the super-saturated atmosphere that develops when plant matter evapo-transpires water into a hypobaric system that is continuously humidified by water-saturated incoming low-pressure air-changes, or commodity evapo-transpiration.

The correlated conditions depend on the weight and density of plant matter relative to the chamber volume, the plant matter's respiration rate and heat production at the storage pressure and temperature, the rate at which humid low pressure air is flowing from the storage space to the pressure regulator, the rate at which low-pressure saturated air enters the system, and the type of plant matter. A vacuum regulator operating at 25° C., substituted for the vacuum breaker specified in U.S. Pat. No. 4,685,305 for use in VacuFresh hypobaric intermodal containers humidified by evapo-transpired water, minimizes weight loss from transported plant matter by reducing the pumping speed and rate at which low-pressure humid air flows from the storage space to the vacuum pump responsive to a progressive natural reduction in the stored plant matter's respiratory heat production. Microbes are killed by vacuum-infiltrating 0.5 to 25 ppm of hypochlorous acid vapor when the hypobaric warehouse or intermodal container is vented.

In one embodiment, the system and method of the invention prevents transpired water vapor released by plant matter in a hypobaric storage space from super-saturating the storage atmosphere and condensing under the storage space's roof, dripping onto storage boxes, and weakening box stacks in LP systems which are humidified by contacting low-pressure air with heated supplementary water. In this embodiment, an absolute vacuum regulator operating at an elevated temperature is substituted in-place of the absolute vacuum breaker specified in U.S. Pat. Nos. 3,958,028, 4,061,483 and in Burg 2009 and US2010/0167144. Pressure control by a vacuum regulator when used with hypobaric intermodal containers humidified exclusively by water transpired from stored plant matter reduces weight loss from stored plant matter by lowering the rate at which saturated low-pressure air is evacuated from the storage space in response to a natural progressive decrease in the amount of respiratory heat produced during storage.

In one embodiment of the invention, non-waxed cardboard storage boxes for plant matter are replaced with storage boxes that are unable to condense water, thereby preventing the heat of water condensation from being released into the storage box and transferring by radiation and convection to plant matter present in the storage box, and thus eliminating the situation where the plant matter must evaporate extra water to dispel the heat it received. To further reduce the transfer of environmental heat to stored plant matter means are provided to reduce radiation from the chamber wall to adjacent storage boxes, and from the inner surface of each storage box to plant matter contained in the box.

In one embodiment of the invention, plant matter is stored at the lowest $O_2$ concentration and pressure which does not cause low-$O_2$ damage in order to minimize respiratory heat production and water evaporation from said matter, while simultaneously preventing microbial growth and limiting the amount of biochemical energy available to carry out energy-requiring processes such as fruit ripening, flower fading, abscission, chlorophyll loss and senescence. Controlled and correlated factors that must be considered to accurately determine the optimal storage pressure and $O_2$ concentration, and a method to measure the steady-state $O_2$ concentration during the operation of hypobaric warehouses, intermodal containers and laboratory hypobaric systems are disclosed.

In one embodiment of the invention, molds and bacteria present on the surface and inside plant matter present in the vacuum chamber are killed by vacuum infiltrating hypochlorous acid vapor over the surface and into the intercellular spaces of plant matter present in the vacuum chamber. The vapor can be produced by a method as described in Canadian Patent No. 997,532,

BRIEF DESCRIPTION OF THE DRAWINGS

The invention is described in more detail with reference to the attached drawings.

DETAILED DESCRIPTION

The system and method of the invention is characterized by controlling the correlated conditions of total pressure, oxygen partial pressure, air intake rate, and pumping speed, as described in U.S. Pat. Nos. 3,958,028, 4,061,483 and 4,685,305, and additionally controlling the pressure with a vacuum regulator operating at a higher temperature than the storage space; storing plant matter in storage boxes which are unable to adsorb water and release the heat of water condensation; shielding the storage boxes from radiation emitted by the storage space's wall; shielding plant matter in the storage boxes from radiation emitted by the box's inner surface; and decreasing the total storage space pressure and steady-state oxygen partial pressure to a minimum value which does not cause low oxygen injury and is optimally effective in extending storage life, reducing metabolic heat and biochemical energy production, and preventing microbial decay in the plant matter.

Figure 1:
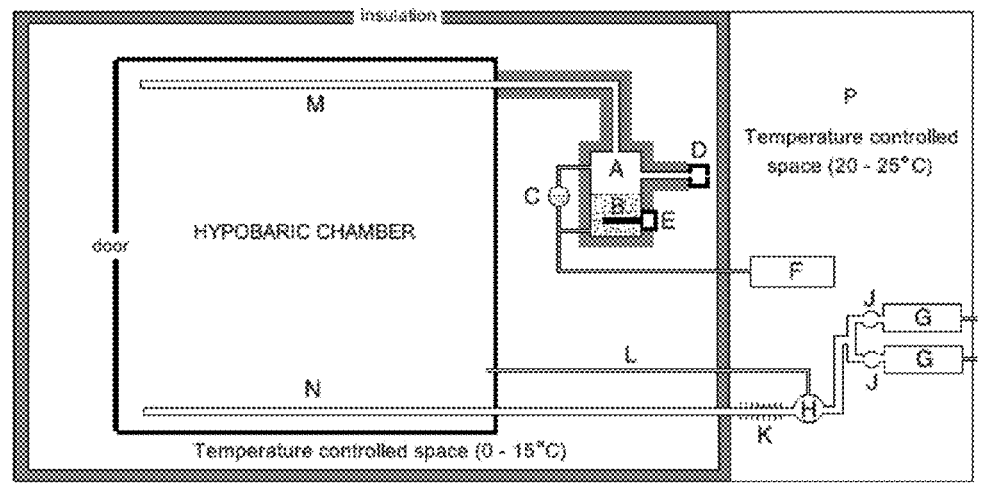
FIG. 1 is a diagram of a hypobaric warehouse in which the pressure is controlled by an absolute vacuum regulator.

A 'metabolic humidification system' operates during every hypobaric storage, evaporating the amount of water from plant matter into the storage atmosphere that is needed to continuously transfer most of the respiratory heat plus any additional heat which the plant matter is receiving from the environment. Convection is ineffective in transferring these heat sources because the convective process is 80-90% inhibited at a low storage pressure (Equations 6 and 7). In LP warehouses and laboratory systems the 'metabolic humidifier' is supplemented by a 'mechanical humidifier' (FIG. 1—A) which warms and evaporates supplementary water (FIG. 1—B) by means of electrical heat (FIG. 1—E) in order to saturate low-pressure air at the selected storage temperature and pressure before said air enters the hypobaric storage space. The advantage gained by using a mechanical humidifier is that a full load, partial load, even a single fruit, vegetable or cut-flower can be stored in a hypobaric warehouse or laboratory apparatus confident that the humidity will always be saturated to minimize commodity water loss.

Figure 3:
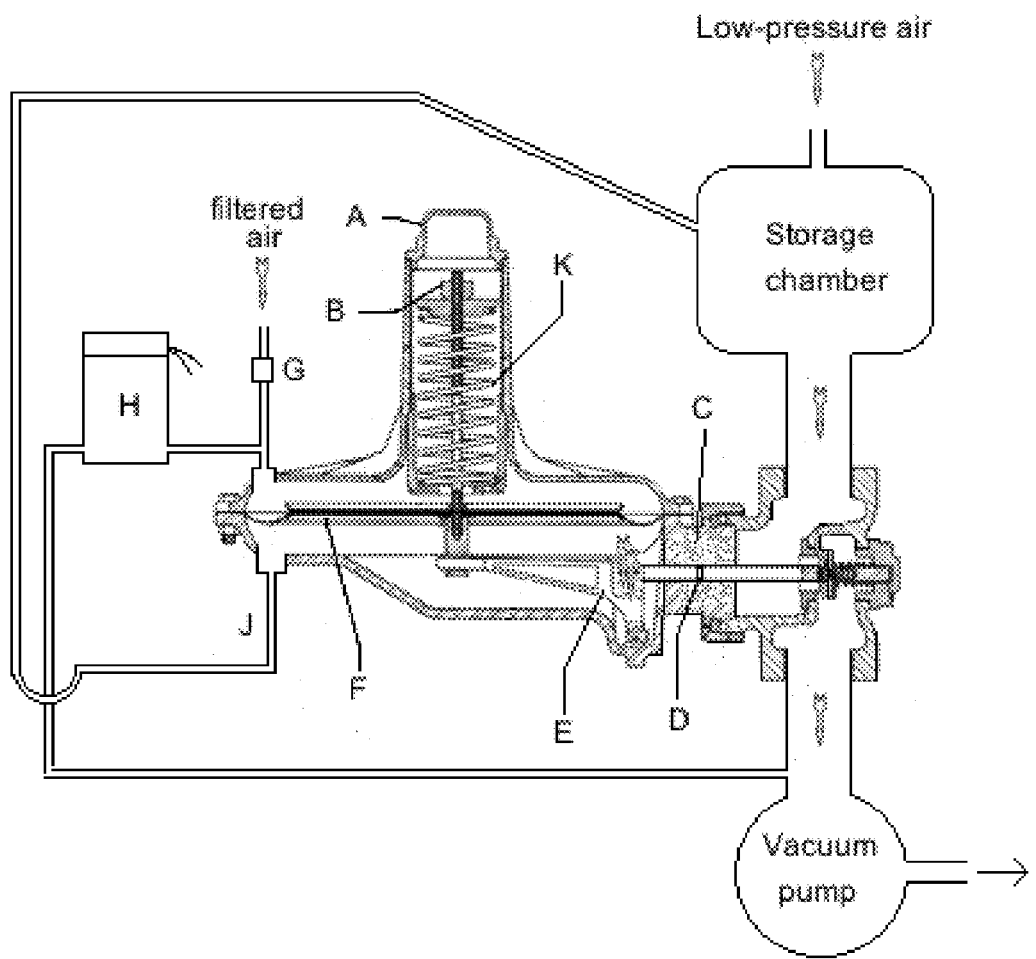
FIG. 3 is a diagram of a Fisher Y696VRM vacuum regulator manually controlled by an LJ model 329 self-relieving vacuum breaker, or computer controlled by a Clippard EVP proportional solenoid control valve in response to an absolute pressure transducer.
Figure 4:
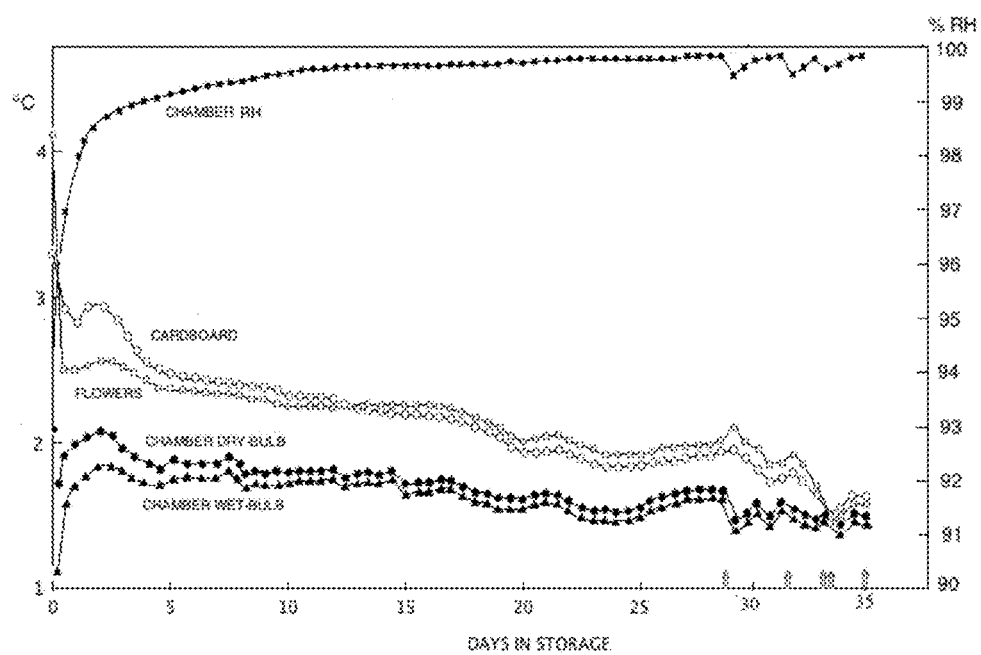
FIG. 4 is a graph recording the air temperature, dew-point temperature, box temperature, flower temperature and chamber RH within a Vivafresh hypobaric warehouse in which non-waxed cardboard boxes containing roses are stored.

According to one embodiment of the invention, hypobaric warehouses and VacuFresh intermodal containers utilize a Fisher Y696VRM vacuum regulator (FIG. 3) to control the storage pressure. The vacuum regulator has a blocked throat (FIG. 3—C) and an O-ring seal on stem shaft D to isolate the reference pressure sensed above diaphragm F from the chamber pressure sensed below diaphragm F through external register J. The tension in spring K is adjusted by spring adjusting nut B to permanently provide a bias pressure of approximately 90 mm Hg drawing diaphragm F upward toward spring K, and the reference chamber is sealed with closing cap A. The reference pressure in the sealed reference chamber is computer controlled at an absolute value by a Clippard EVP control solenoid valve responsive to an absolute pressure transducer, as described in Burg et al. (2009), or manually controlled by LJ self-relieving model 329 vacuum controller H. Orifice G provides a constant leak of filtered air to make EVP valve H self-relieving, but is not required when a 329 self-relieving vacuum breaker is used. Changing the reference pressure in response to a computer generated signal to the EVP solenoid valve, or a manual adjustment of the LJ 329 self-relieving controller, selects the operational pressure controlled by the Y696VRM vacuum breaker. Because the reference pressure is adjusted to be lower than the spring tension by the desired operational pressure the LJ329 is able to control the Y696VRM at and below a 10 mm Hg operational pressure even though the LJ329 is unable to directly control a pressure that low.

The flow capacity of the Y696VRM regulator is given by:

$$Q = P_{1abs}C_g \text{SIN}\left(\frac{3415}{C_1}\sqrt{\frac{\Delta P}{P_{1abs}}}\right)DEG \qquad \text{Equation 2}$$

where Q is the flow capacity (SCFH@60° F., 14.7 psia) of air; $P_{1abs}$ is the absolute inlet pressure [$P_i$ (psig)+14.7]; $C_g$ is the flow coefficient (515); $C_1$=35; and $\Delta P$ is the pressure drop across the vacuum regulator (psig). Equation 2 predicts that the Y696VRM vacuum regulator is able to flow vastly more SCFH of air than is required to evacuate two air changes per hour from a hypobaric warehouse or VacuFresh intermodal container while developing less than a 1 mm Hg pressure differential across the vacuum regulator. Therefore the vacuum regulator will not significantly reduce the vacuum pump's efficiency or capacity. Equation 2 assumes that only air is flowing, but the flowing mixture contains 46% water vapor at a 10 mm Hg, 0° C. storage condition. The actual flow at 10 mm Hg will be 20% higher than Equation 2 predicts because the density (mass/volume) of water vapor and air are 0.804 and 1.27 g/L, respectively, and Equation 2 assumes that the entire flowing mixture has the higher density.

To avoid extra water loss from plant matter due to accelerated water adsorption in non-waxed cardboard storage boxes at a low pressure, LP systems that are humidified by air-changes saturated by contact with heated supplementary water should store plant matter in boxes which are unable to adsorb water and release the latent heat of water condensation. The same type of box is suitable for use in VacuFresh hypobaric intermodal containers, but additional steps are required because the storage atmosphere in VacuFresh is metabolically humidified by evapo-transpiration. The pumping speed in VacuFresh intermodal containers initially is adjusted so that product water evaporated in response to respiratory heat produced by the type and weight of the plant matter being transported saturates the incoming air-changes after they have expanded and dried during entry into the storage space. See U.S. Pat. No. 4,685,305; Burg, 2004. The pumping speed selected for each type of plant matter is estimated based on the amount of metabolic heat the plant matter initially produces at the storage pressure and temperature. Evaporation from the plant matter is not influenced by the lack of a mechanical humidifier because water loss is determined by the amount of metabolic heat produced and environmental heat acquired, independent of whether a mechanical humidifier is used. See Burg, 2004.

Figure 2:
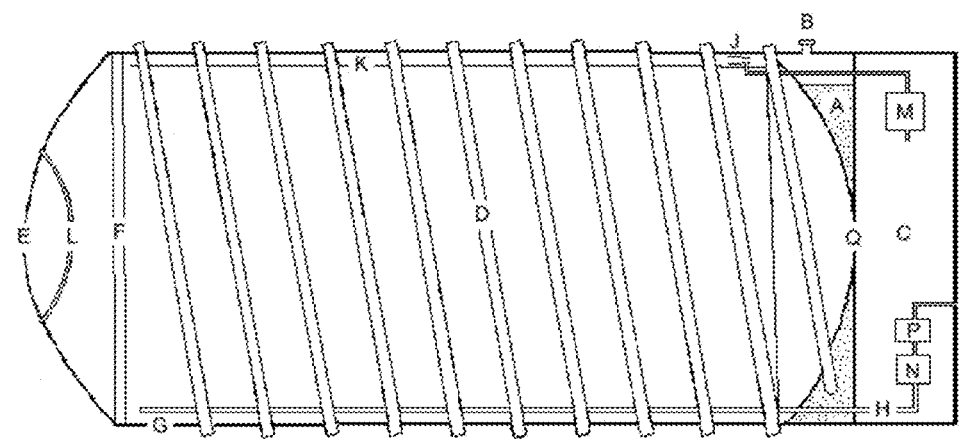
FIG. 2 is a diagram of a hypobaric intermodal container in which the pressure is controlled by an absolute vacuum regulator.

Weight loss from plant matter shipped in a VacuFresh hypobaric intermodal container can be decreased by taking advantage of the reduction in respiratory heat production which occurs during storage. See Hardenburg. This is accomplished by replacing the absolute vacuum breaker specified in U.S. Pat. No. 4,685,305 with an absolute vacuum regulator operating at 25° C. (FIG. 2—N), and adjusting the air flow into the chamber with a thermal mass flow controller (FIG. 2—M). Net radiative transfer of heat from the aluminum chamber wall to adjacent exterior boxes must be reduced to a minimum to ensure that decreased flow from the chamber to the vacuum regulator rather than increased plant matter evapo-transpiration caused by acquired environmental heat keeps the storage pressure at its initial value. In a container filled with cargo boxes the radiation view factor=1 and radiation occurs from the container wall to outer boxes across two parallel surfaces. When the temperature of the chamber wall ($T_1$) is higher than the box's surface temperature ($T_2$) net radiation from the wall to box ($Q_{1-2}$, watts) equals the radiation energy leaving the wall that strikes the box minus the radiation energy leaving the box that strikes the wall:

$$Q_{1-2}=A\sigma(T_1^4-T_2^4)/[(1/\epsilon_1)+(1/\epsilon_2)-1] \qquad \text{Equation 5}$$

where $\epsilon_1$ and $\epsilon_2$ are the emissivities (Table 2) and $T_1$ and $T_2$ the temperatures (K) of the wall surface and outer boxes, respectively; A (m²) is the surface area through which radiation is occurring ($A_1$=$A_2$); and $\sigma$ is the Stefan-Boltzman constant (5.6697×10⁻⁸ W/m²·K⁴).

If $T_1$ is larger than $T_2$ Equation 5 yields positive values indicating the intensity of aluminum wall to outer box net radiation ($Q_{1=2}$); if $T_2$ is larger than $T_1$ Equation 5 yields negative values indicating the net intensity of box to aluminum wall net radiation ($Q_{2-1}$). The aluminum wall should not be painted or anodized as this increases the wall's emissivity (Table 2), thereby enhancing net radiation from the aluminum to adjacent boxes by up to 2.8-fold. Coating the outer surface of the cardboard boxes with a radiation retarding low emissivity barrier only costs 10 to 20 cents and decreases net radiation from the bare aluminum chamber wall to adjacent cardboard boxes by 58 to 96% (Table 2, Equation 5). Radiant exchange between the aluminum chamber wall and inner boxes is reduced by >90% because inner boxes are shielded from chamber wall radiation by outer boxes. Equation 5 predicts that a Mylar® slip-sheet inserted inside each box, with its shiny surface facing inward, should reduce radiation from a cardboard box to stored plant matter by 69 to 80% (Table 2), thereby decreasing evapo-transpiration from plant matter in the box to nearly the same extent. A Mylar® slip sheet reduced weight loss from roses packed in non-waxed cardboard boxes by 69% during a 35 day storage in a Vivafresh hypobaric warehouse. A radiation barrier coating applied to the inner surface of the storage box must be FDA approved for contact with food, and is less expensive than a Mylar® slip sheet.

TABLE 2

| Emissivity of opaque surfaces in the physiological temperature range ||
| --- | --- |
| Material | Emissivity |
| Aluminum | |
| Polished | 0.039-0.057 |
| Bright Foil | 0.04-0.05 |
| Oxidized (Mylar ®) | 0.20-0.31 |
| Painted | 0.8 |
| Anodized | 0.77-0.84 |
| Cardboard | 0.81 |
| Barrier coated | 0.05-0.19 |
| Water or ice | 0.97 |
| Green plant leaf | 0.96 |

Forced convective heat transfer ($Q_c$, watts) to or from an object is given by:

$$Q_c=h_m A(\Delta T) \qquad \text{Equation 6}$$

where $h_m$ is the mean convective heat transfer coefficient (W/m₂·° C.), A is the object's surface area (m²), and $\Delta T$ is the temperature difference (° C.) between the object and the ambient air. The mean film coefficient for forced convection is:

$$h_m=0.678 \, k(Re_L)^{1/2}(Pr)^{1/3}L^{-1} \qquad \text{Equation 7}$$

where k is the thermal conductivity (W/m·K), L is a characteristic dimension (m), and the Reynolds ($Re_L$=Lvρ/μ) and Prandtl (Pr=$c_F$μ/k) numbers are dimensionless values used to simplify engineering calculations, ρ is the gas mixture's density (kg/m$^3$), ν the velocity of flow (m/s), μ the dynamic viscosity (kg/m·s), and $c_p$ the specific heat at constant pressure (kJ/kg·K). The water vapor mole fraction in saturated air at 1 atm is 0.006 at 13° C. and 0.012 at 0° C.; it is 0.56 in LP at 20 mm Hg, 13° C., and 0.46 at 10 mm Hg, 0° C. The higher water-vapor mole fraction in LP lowers the air/water-vapor mixture's specific heat, increases its dynamic viscosity and thermal conductivity, and the mixture's density (ρ) is inversely proportional to the pressure. These changes alter $Re_L$ and Pr, reducing $h_m$ at 10 mm Hg to approximately 11% of its value at 1 bar (Burg and Kosson, 1983), thereby decreasing the likelihood that convective heat transfer from the aluminum chamber wall and chamber atmosphere to the box, and from the box to the plant matter will evapo-transpire extra water from the plant matter before the pressure regulator adjusts the pressure.

A Mylar® or polyethylene slip-sheet inserted in a box elevates the stored plant matter's temperature by acting as a thermal insulator and increasing $r_{box}$. This restricts the escape of moisture from the box and inhibits evaporative cooling (Equation 4). When plant matter becomes the warmest object in the storage space radiation and convection cannot transfer heat to said matter from the chamber wall or atmosphere and the plant matter cannot evaporate more water than its respiratory heat is able to vaporize.

Figure 5A:
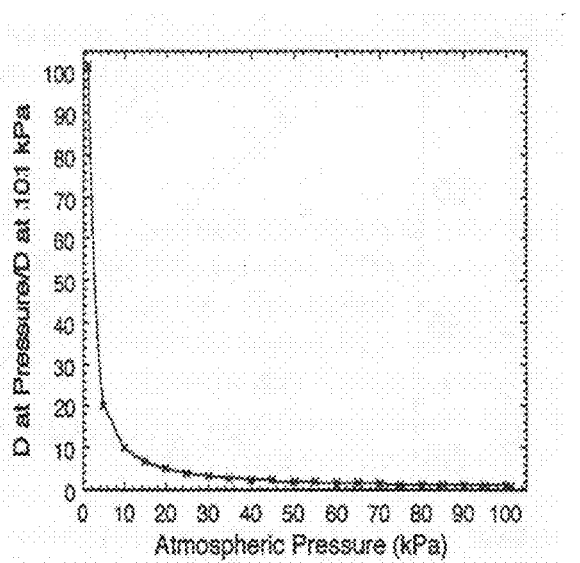
FIG. 5A depicts the effect of pressure on the air/water-vapor binary diffusion coefficient (D).
Figure 5B:
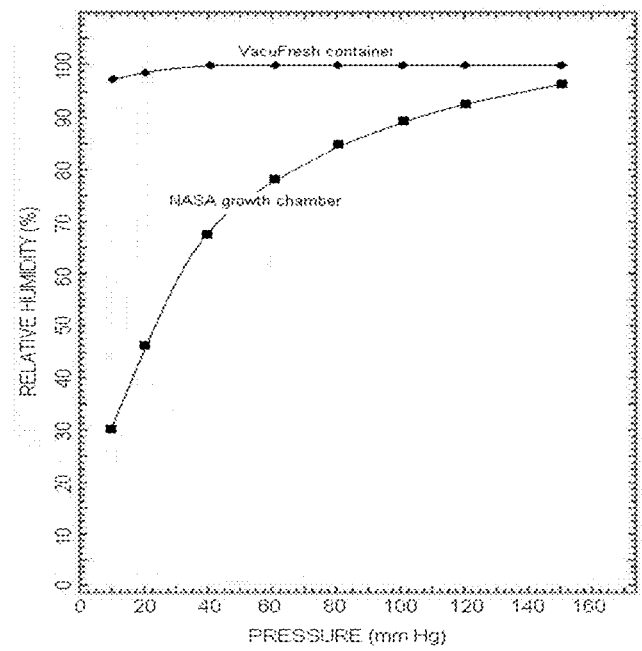
FIG. 5B depicts the effect of leak rate on the relative humidity inside hypobaric storage spaces humidified at various operational pressures.

According to one embodiment of the invention, a thermal mass flow controller (FIG. 2—M) is used to select the airflow rate into the storage space through the jets of the pneumatic air horn (FIG. 2—J) described in U.S. Pat. No. 4,685,305. Normally closed flow-controller M is initially adjusted, depending on the type and weight of plant matter being shipped, to saturate the storage atmosphere with transpired water at the selected storage temperature and pressure, and is not powered until the tank pressure has decreased to the selected operational pressure. Various thermal mass flow controller models are able to deliver the required standard liters/minute (SLM) of air flow across a small enough mbar pressure gradient to ensure that the equilibrium pressure that develops between the air-horn and flow controller automatically adjusts to >1.9-fold higher than the storage pressure, ensuring optimal performance. Progressively as the plant matter's respiration rate declines during storage less respiratory heat is produced to evapo-transpire commodity water, and the vacuum regulator responds by slowing the pumping speed in response to a decrease in the sensed pressure, thereby returning the storage space's atmosphere to saturation at the initial storage pressure. See Hardenburg. The inflow of air into the storage space through the thermal mass flow controller does not change because 'choked' flow into the storage space depends on the pressure upstream of the pneumatic air horn's jets independent of the pressure downstream of the jets. Since stored plant matter always saturates the storage atmosphere, the rate of water loss from said matter varies depending on the pumping speed, and decreases when the pumping speed slows. Vacuum pump (FIG. 2—C) and all control components needed to carry out the improved method are housed in a 25° C. temperature controlled section of the VacuFresh equipment package where the control components are not externally or internally exposed to a high humidity or condensed water which might interfere with their function, and the gas-ballasted vacuum pump operates at a high enough temperature to prevent water from condensing in the pump oil.

The pneumatic ventri air horn mixes temperature controlled 25° C. ambient air with low-pressure air present in the storage space at the storage temperature, and the incoming air emitted by the pneumatic air horn's jets expands into an essentially 'infinite' volume, decreasing in humidity but hardly changing in temperature. See Burg, 2004. At a storage temperature of 0° C. the pneumatic air horn mixes approximately 40 parts of circulating high humidity low-pressure container air with one part of expanded low-pressure incoming 25° C. air, and if the incoming air was bone-dry the temperature of the mixture discharged from the pneumatic air horn would be 0.6° C. and the relative humidity less than 6% lower than the RH of the mixture present in the storage space. Due to the incoming rarified air's low heat capacity and said air's close contact with the container wall and duct K (FIG. 2) the mixture cools to 0° C. and increases in humidity by 4% before it encounters plant matter at the door end.

A Fisher Y696VRM vacuum regulator increases the flow of the low-pressure storage mixture from the storage space to the vacuum pump by an amount that depends on the weight and type of commodity being stored, the storage temperature, the storage space's volume, and the plant matter's respiratory heat production at the storage temperature. The increased flow from the storage space to the vacuum pump lowers the storage air's $O_2$ partial pressure, and to avoid low-$O_2$ damage to stored plant matter the storage pressure must be elevated by 3 to 5 mm Hg above the value which is optimal when a vacuum breaker is used to control the pressure. Elevating the storage pressure increases the vacuum pump's SCFM capacity and therefore when the pressure is controlled by a Y696VRM vacuum regulator it is not necessary to increase the size of the vacuum pump used in prior hypobaric systems.

FIGS. 2 and 6 illustrate several improvements in the VacuFresh hypobaric intermodal container design not previously disclosed. The cylindrical tank barrel is reinforced with an automatically welded spirally wrapped rectangular extrusion which replaces the circular stiffening rings, interconnecting piping between stiffening rings, and reinforcing bracing required for a considerable length along both sides of each stiffening ring where the integrity of the stiffening ring was broken to install interconnecting piping in the original VacuFresh design See Burg, 2004. Five roof-mounted aluminum meat rails and a central meat trolley have been eliminated, and two full length heavy aluminum retractable shelves no longer are required because the container will in the future be loaded with plant matter packed in boxes that do not adsorb or absorb water and lose stacking strength. The pneumatic air horn (FIG. 2—J) discharges through an aluminum duct attached at the tank's upper center-line (FIG. 2—K), instead of under a full-length shelf. The new arrangement substantially reduces the manufacturing cost by decreasing the weight of aluminum and cost of hand labor. Solid state controls are replaced by computer based systems, and to improve high ambient temperature performance an R-134a refrigeration scroll compressor is substituted for the R-404a compressor originally used in VacuFresh (FIG. 6).

Low Pressure for Hypobaric Storage

An advantage of hypobaric storage that cannot be duplicated by other storage methods is the elimination of the $O_2$, $CO_2$, and $C_2H_4$ gradients that develop at atmospheric pressure between the center and surface of plant matter's intercellular system. LP decreases these gradients because at a low pressure stomata open in darkness, respiratory $O_2$ consumption is inhibited by 80-90%, and $O_2$ and $CO_2$ rapidly diffuse through the commodity's peel and intercellular air spaces due to the low pressure. See VEIERSKOV, B. and KIRK, H. G. (1986) Senescence in oat leaf segments under hypobaric conditions. Physiol. Plant. 66: 283-287 ("Veierskov and Kirk"); KIRK, H. G. and ANDERSON, A. S. (1986) Influence of low-pressure storage on stomatal opening and rooting of cuttings. Acta Hort. 181: 393-397 ("Kirk and Anderson");

KIRK, H. G., ANDERSON, A. S, VEIERSKOV, B., JOHANSEN, E., and AABRANDT, Z. (1986) Low-pressure storage of hibiscus cuttings. Effect on stomatal opening and rooting. Ann. Bot. 58 (3): 389-396 ("Kirk et. al."); Burg, 2004; FIG. 5A.

The increased diffusion rate at a low pressure eliminates up to 98.6% of the surface to center $O_2$-gradient which arises at atmospheric pressure, and the respiratory inhibition at a low pressure reduces the $O_2$-gradient by as much as an additional 10-fold. Eliminating the $O_2$ gradient causes the commodity's surface and center to be exposed to the same optimal low $O_2$ partial pressure, whereas controlled atmosphere storage (CA) and modified atmosphere storage (MA) must provide a higher applied $O_2$ concentration at plant matter's surface to avoid low-$O_2$ damage in plant matter's center.

The accumulation of ethanol and acetaldehyde in fermenting plant matter are considered to be the major cause of low-$O_2$ injury. See FIDLER, J. C. (1951) A comparison of aerobic and anaerobic respiration of apples. J. Expt. Bot. 2: 41 ("Fidler"); IMAHORI, Y., UEMURA, K., KISHIOKA, I., FUJIWARA, H., TILIO, A. Z., UEDA, Y. and CHACHIN, K. (2005) Relationship between low-oxygen injury and ethanol metabolism in various fruits and vegetables. Acta Hort. 682: Proceedings of the $5^{th}$ International Postharvest Symposium. Verona, Italy, Jun. 6-11, 2004 ("Imahori"). In different types of plant matter the respiratory inversion point below which fermentation and low-$O_2$ injury occur at a low storage temperature varies from 1 to 5% $O_2$ at atmospheric pressure. In one embodiment of the invention, during hypobaric storage, the respiratory inversion point typically occurs close to 0.08% $O_2$.

EXAMPLE

Hypobaric Storage of Fruit, Vegetables and Flowers

Figure 6:
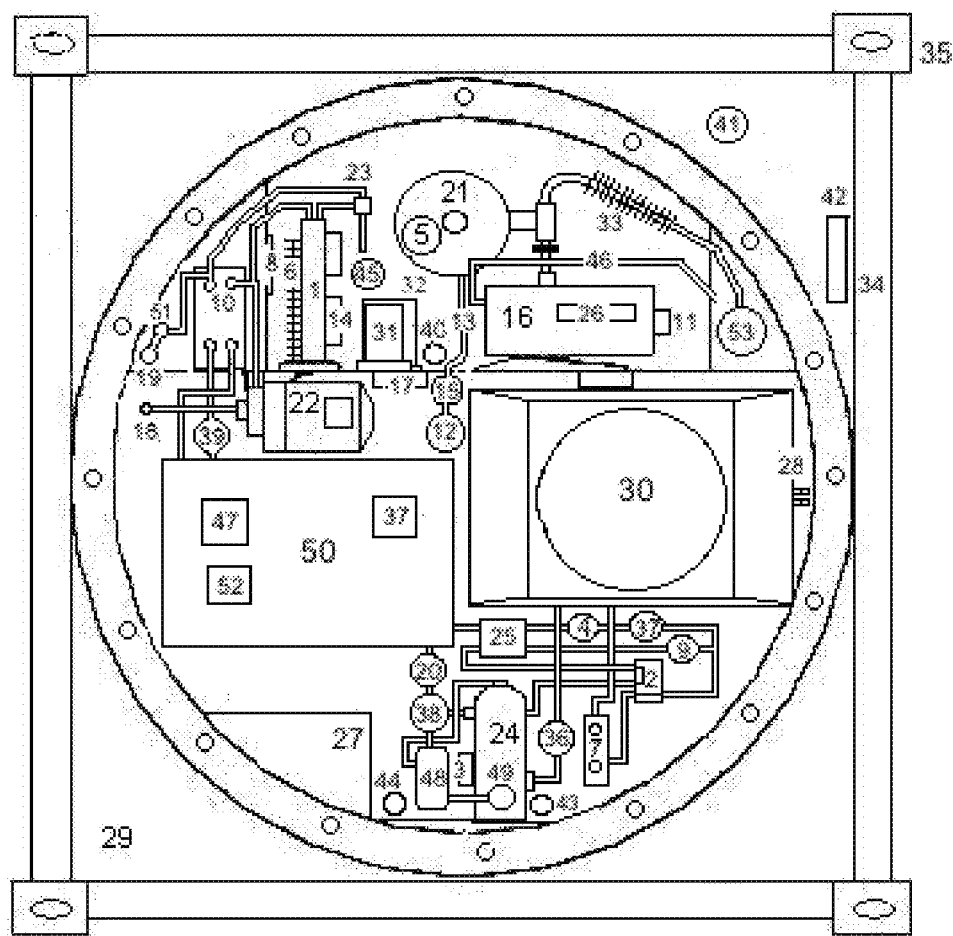
FIG. 6 is a diagram of a revised VacuFresh equipment package.

At 10° C. a papaya's respiratory inversion point at atmospheric pressure occurs at 1 to 2% $O_2$, in LP at 0.08% $O_2$ (FIG. 6 in EP20100267144). Papayas can be stored at 10° C., 15 mm Hg (0.08% $O_2$) for at least 3-4 weeks, and at the same temperature papaya experience low-$O_2$ injury within a few days in CA at <1% $O_2$, and in LP between 0.02 to <0.08% $O_2$. See Burg, 2004. At 13° C. mangoes suffer low-$O_2$ injury in CA at <3% $O_2$, in LP at and below 0.078% $O_2$ (Table 3), and at the same temperature mangoes can be stored in LP for 8 weeks at 15 mm Hg (0.1% $O_2$). Chrysanthemum blooms are well preserved for 42 days at 0° C., 10 mm Hg (0.14% $O_2$), and green beans have been successfully stored for 38 days in 0.08% $O_2$ at 7.2° C., 10 mm Hg, but green beans and chrysanthemums are severely injured in CA at 0.1% $O_2$. Avocados have been stored in 0.1% $O_2$ for 49 to 60 days at 13° C., 15 mm Hg, but in CA low-$O_2$ injury occurs within one day in 0.1 to 0.4% $O_2$. See Burg, 2004.

The steady-state $O_2$ concentration within a hypobaric storage space can be precisely determined by measuring the $O_2$ concentration in air exhausting from the vacuum pump. The pump must be briefly operated without introducing gas-ballast air, and because air and water vapor present in the storage space's low-pressure atmosphere are not significantly soluble in vacuum pump oil they pass through into the pump's exhaust where the $O_2$ can be accurately measured within a few minutes by means of a colorimetric gas detector tube or gas chromatography. The $O_2$ concentration in low-pressure storage air is increased in the vacuum pump exhaust proportional to the vacuum pump's compression ratio (atmospheric pressure/storage pressure). Based on this measurement corrections needed to adjust the chamber $O_2$ concentration to any value determined in laboratory studies to be optimal for storing the particular type of plant matter can easily be made when a new variety of plant matter is shipped in an LP intermodal container or stored in an LP warehouse system for the first time. This eliminates the uncertainty expressed in U.S. Pat. No. 4,685,305 regarding estimates of the equilibrium $O_2$ concentration in the storage space.

To determine if LP reduces the likelihood of low-$O_2$ damage by promoting the escape of ethanol and acetaldehyde from plant matter the experiment summarized in Table 2 was carried out under conditions which caused mangoes to suffer low-$O_2$ damage during both CA and LP storage. Mangoes were stored at 13° C., flowing one saturated incoming air-change per hour containing 0.14±0.007% $O_2$ through a CA chamber, or one incoming saturated 15 mm Hg air-change per hour containing 0.1% $O_2$ into the LP chamber. Mango transpiration caused a pressure regulator operating at 25° C. (FIG. 1—H) to increase the pumping speed and air-flow between the LP chamber and vacuum pump by 1.54-fold without changing the rate at which saturated low-pressure air containing 0.1% $O_2$ entered the LP chamber. By the 4th storage day the accelerated air flow between the storage space and vacuum regulator was reducing the measured $O_2$ concentration in the LP chamber to 0.078±0.002% and elevating the $CO_2$ concentration produced by fermentation to between 0.71±0.01 and 0.79±0.002%. Air leaving the CA chamber contained 0.145±0.006% $O_2$ and 0.71±0.006% $CO_2$. These data indicate that both in CA and LP essentially none of the incoming $O_2$ was being consumed and nearly all $CO_2$ was produced by fermentation.

Because plant matter synthesizes ethanol and acetaldehyde in a liquid state sufficient latent energy must be provided to change the state of these volatile organic substances (VOCs) from liquid to vapor before they can evaporate or boil. $CO_2$ is biosynthesized in a gaseous state, and Table 3A indicates that the amount of heat generated by fermentative $CO_2$ emanation could only vaporize an amount of transpired water per hour which in a liquid state was able to dissolve and transport approximately 0.14% of the ethanol and acetaldehyde which emanated from mangoes during the LP and CA storages described in Table 3. This calculation demonstrates that ethanol and acetaldehyde did not escape dissolved in transpired water. Instead these VOCs passively diffused through the plasmalemma and cell wall, vaporized from the outer surface of the plasmalemma in response to metabolic heat, then passed through the intercellular system and exited through mango lenticles.

TABLE 3A

Emanation rate and aqueous concentrations of ethanol, acetaldehyde and $CO_2$ in mangoes after 4 days storage at 13° C. Six untreated mangoes initially contained 23 ± 4 μM, ethanol 75 ± 9 μM acetaldehyde and 12.4 ± 1.0 mM $CO_2$ per kg of tissue.

| | Concentration in fruit's aqueous phase (mmoles.kg$^{-1}$) | | Emanation Rate μmoles.kg$^{-1}$.h$^{-1}$) | |
|---|---|---|---|---|
| | CA | LP | CA | LP |
| $C_2H_5OH$ | 1.89 ± 0.14 | 2.09 ± 0.14 | 24.9 ± 1.4 | 63.0 ± 6.0 |
| $CH_3CHO$ | 0.22 ± 0.015 | 0.32 ± 0.047 | 1.5 ± 0.2 | 4.6 ± 0.7 |
| $CO_2$ | 11.7 ± 2.1 | 8.0 ± 2.2 | 799 ± 73 | 1210 ± 85 |

TABLE 3B

The apparent membrane permeability to ethanol, acetaldehyde and $CO_2$ calculated as mmoles.kg$^{-1}$.h$^{-1}$ of gas or vapor emitted from the fruit divided by the gas or vapor's mmole.kg$^{-1}$ concentration in the tissue. Both in CA and LP the mmoles.kg$^{-1}$.h$^{-1}$) emanated per mmole.kg$^{-1}$ in the tissue was in the ratio 100:52:1 for acetaldehyde, ethanol, and $CO_2$, respectively.

| | Apparent membrane permeability (mmoles.kg$^{-1}$) | | |
|---|---|---|---|
| | CA | LP | CA/LP |
| $C_2H_5OH$ | 75.9 ± 5.5 | 33.2 ± 6.5 | 2.3 |
| $CH_3CHO$ | 146.6 ± 9.9 | 69.5 ± 10.2 | 2.1 |
| $CO_2$ | 1.46 ± 0.26 | 0.66 ± 0.18 | 2.2 |

The gradient which causes a small lipid soluble non-polar molecule to diffuse through the lipid portion of the plasma membrane is the difference between the molecule's aqueous concentration at the inner surface of the membrane minus the substance's concentration at the outer surface. Because lipid membranes and aqueous solutions have different solvent properties, a partition coefficient is applied to estimate the concentration gradient moving solute molecules through the membrane lipid. The dimensionless partition coefficient is the concentration in the membrane's lipid material vs. that in an adjacent aqueous phase. It is determined for each solute by measuring the ratio between the solute's concentration in a lipid material such as olive oil or octanol, which mimics membrane lipid, vs. the dissolved solute's equilibrium concentration in water. This convention is based on experiments showing that the relative ease with which small non-polar molecules passively penetrate through the plasma membrane often is correlated with their lipid solubility and molecular size or octanol/water's 0.03 partition coefficient. See COLLANDER, R. (1937)

The permeability of plant protoplasts to non-electrolytes. Trans. Faraday Soc. 33: 985-990 ("Collander"). The ethanol concentration at the outer surface of the plasma membrane, estimated by multiplying the ethanol concentration in the tissue (Table 3A) by ethanol's 0.03 olive-oil/water partition coefficient, predicts that the CA air-change would contain 198.4 ppm of ethanol vapor, and the LP air-change 171 ppm if the amount of liquid ethanol that continuously diffused to the outer surface of the plasmalemma was constantly vaporized by metabolic heat. See Collander; SANGSTER, J. (1997) Octanol-Water Partition Coefficients Fundamentals and Physical Chemistry. Series in Solution Chemistry, Vol. 2, 170 pps. John Wiley & Sons, Inc. (Sangster). These values are closely similar to the 236.7 and 171 ppm ethanol concentrations measured in air flowing through the CA and LP chambers, respectively (Table 3A).

EP20100267144 presents evidence indicating that a system resembling commercial pervaporation operates in plant matter during hypobaric storage. Pervaporation is unique among membrane separation processes in including a phase change from liquid to vapor. A synthetic very strong membrane separates a solution containing one or more volatile liquids, usually at 1 atm pressure, on one side, from a vacuum condition, on the other side of the membrane. The liquid volatiles pass through the membrane at rates determined by their specific nature and the membrane's characteristics. Heat is supplied to vaporize the permeating volatile liquid(s) at the evacuated side of the membrane, and to maximize mass transport across the membrane the vapor pressure of a component on the permeate side is kept low by evacuating (vacuum pervaporation) or purging the permeate (sweep gas pervaporation). To ensure that the permeate boils at the vacuum side of the membrane an amount of heat must be supplied that is at least as great as the permeate's heat of vaporization, and the permeate's pressure must be kept lower than its saturation vapor pressure at the process temperature. The separation is based on physical-chemical interactions between the membrane material and the permeating molecules, independent of vapor/liquid equilibrium. The driving force for the mass transfer of permeants from the membrane's feed side is the volatile organic compound's chemical potential or partial pressure gradient across the membrane, not its volatility. Raising the feed pressure increases the chemical potential gradient and flux through a pervaporation membrane, tenfold for a feed pressure elevation from 1 to 10 atmospheres. The permeation rate of a feed component also is increased by decreasing the pressure on the 'permeate' side of the membrane.

TABLE 4

Boiling point of pure water, ethanol and acetaldehyde at various storage temperatures and pressures.

| Storage Pressure | Boiling Point (° C.) | | |
|---|---|---|---|
| (mm Hg) | Water | Ethanol | Acetaldehyde |
| 760 | 100 | 78.4 | 20.2 |
| 30 | 29.0 | 14 | −42 |
| 20 | 22.2 | 8.0 | −47.8 |
| 15 | 17.6 | 4.0 | −53 |
| 10 | 11.3 | −2.3 | −56.8 |

The passive escape of volatile liquids across a plant cell's plasmalemma during hypobaric storage has all of the characteristics of vacuum pervaporation. Like a commercial synthetic pervaporation membane, plant matter's plasmalemma reinforced by an elastic cell wall withstands a 4 to 20 atmosphere pressure difference between the hydrostatic pressure inside a turgid plant cell (feed side) and the low-pressure in the evacuated intercellular system (permeate side). Both the plasmalemma and a synthetic pervaporation membrane are semi-permeable; metabolism supplies more heat than is needed to vaporize volatile liquids which passively diffuse through plant matter's plasma membrane; and during hypobaric storage the low-pressure in plant matter's intercellular system accelerates the diffusive escape of the released vapors (FIG. 5A) and like vacuum pervaporation, LP storage keeps the permeate pressure lower than the VOC's saturation vapor pressure at the process temperature.

The boiling points of pure water, ethanol and acetaldehyde at various temperatures and pressures are shown in Table 4, but when ethanol and acetaldehyde are present in a dilute aqueous solution they boil at the temperature/pressure combination indicated for pure water rather than that for pure ethanol or acetaldehyde. During LP storage a pressure/temperature combination is intentionally selected which cannot boil pure water from plant cells due to their high turgor pressure. This should result in the fermentative accumulation of ethanol and acetaldehyde in cellular water, from which these VOCs could only be preferentially vaporized if they became separated from water. $C^{14}$-ethanol and $H^3$-water have been reported to cross the plasma membrane of plant cells independent of each other and do not interact in the presence or absence of a simultaneous influx of water. See PALTA, J. P., and STADELMANN, E. J. (1980). On simultaneous transport of water and solute through plant cell membranes: Evidence for the absence of solvent drag effect and insensitivity of the reflection coefficient. Physiol. Plantarum 50 (1): 83-90

("Palta and Stadelmann"). Therefore when a plant cell's high hydrostatic pressure accelerates the diffusive efflux of a small fat-soluble molecule such as ethanol through the hydrophobic lipid portion of the plasma membrane the ethanol moves independent of water, and upon reaching the membrane's outer permeate surface can acquire metabolic or sensible heat and boil separated from water. Lowering the pressure to 15 mm Hg at 13° C. caused a 2.1 to 2.3-fold increase in the rates at which acetaldehyde, $CO_2$, and ethanol diffused through the plasma membrane into a mango's intercellular system and escaped into the air-change (Table 3B; CA/LP). As the enhanced loss of these molecules is unrelated to any common structural feature it must be due to the equal diffusion rates of all gases and vapors present in a mixture, and to a large increase in the diffusion rate at a low pressure (FIG. 5A). The increased loss of these VOCs during hypobaric storage allows the process to be carried out somewhat below the respiratory inversion point without causing plant matter to experience low-$O_2$ injury.

Fumigation with Hypochlorous Acid Vapor

Low $O_2$ partial pressure during hypobaric storage prevents the growth and sporulation of aerobic and micro-aerophylic bacteria and molds, but does not kill them. They can develop when the commodity is removed from an LP intermodal container and distributed at atmospheric pressure. In addition, although most bacteria and molds that infect plant commodities are aerobic or micro-aerophylic, several anaerobic forms are able to grow and sporulate on plant commodities at a low pressure. Therefore a safe method that kills bacteria and molds, that is approved by the EPA and FDA, is highly desirable.

Masterman (1938) demonstrated that dispersing a NaOCl aerosol into air, killed air-borne bacteria. See MASTERMAN, A. T, 1938, Air purification in inhabited rooms by spraying or atomizing hypochlorites. J. Ind. Hygiene 20: 278-288 ("Masterman 1938"); MASTERMAN, A. T., 1941, Air purification by hypochlorous acid gas. J. Ind. Hygiene 41(1): 44-64 ("Masterman 1941"). He filed United Kingdom Patent GB480176 entitled "Improvements in and relating to air purification". In 1941, Masterman confirmed that hypochlorous acid vapor (HOCl) generated when NaOCl solutions are acidified by atmospheric $CO_2$, is the active germicide produced in hypochlorite aerosols. Less than a 5 to 30 minute exposure to a low HOCl vapor concentration can be 100% effective in killing air-borne bacteria, and as little as 0.5 ppm HOCl vapor in air was more than 99% effective in killing the air-borne influenza virus within 7.5 to 30 minutes See EDWARDS and LIDWELL, 1943, Studies on air-borne virus infections. III. The killing of aerial suspensions of influenza virus by hypochlorous acid. J. Hyg. (London) 43(3): 196-200 (Edwards and Lidwell).

Myeloperoxidase (MPOase), the most abundant protein in white blood cells (neutrophils), generates HOCl from $H_2O_2$ and Cl$^-$. See ALBRICH, J. M., McARTHY, C. A. and HURST, J. K., 1981, Biological reactivity of hypochlorous acid: Implications for microbial mechanisms of leukocyte myeloperoxidase. Proc. Natl. Acad. Sci. USA 78(1): 210-214 ("Albrich); FOOTE, C. S., GROYNE, T. E. and LEHRER, R. I. (1983) Assessment of chlorination in human neutrophils. Nature 301: 715-716 ("Foote"); KETTLE A. J. and WINTERBOURN, C. C. (1997) Myeloperoxidase: a key regulator of neutrophil oxidant production. Redox. Rep. 3: 3-15 ("Kettle"); and SUZUKI, T., MASUDA, M., FRIESEN, M. D., FENET, B. and OSHIMA, H. (2002) Novel products generated from 2'-deoxyguanosine by hypochlorous acid or a myeloperoxidase-$H_2O_2$—Cl$^-$ system; identification of diimino-imidazole and amino-imidazole nucleosides. Oxford Journals of Life Science. Nucleic Acids Res. 30(11): 2555-2564 ("Suzuki"). The HOCl plays an important role in the host defense microbiocidal reactions (oxidative burst pathway) of polymorphonuclear leukocytes (PMNs) after they engulf invading pathogens. The gross features of the reactions are similar in phagocytosing PMNs, the cell-free MPOase-$H_2O_2$—Cl$^-$ system, and in the response to applied exogenous HOCl. When bacterial cells are exposed to HOCl, iron-sulfur-proteins, β-carotene, nucleotides, lipids, protein amino groups, and porphyrins are rapidly reacted, enzymes containing cysteine are inactivated, DNA replication is inhibited, protein unfolding and aggregation is promoted, and rapid irreversible oxidation of cytochrome and adenine nucleotides occurs (Albrich). The bactericidal action of HOCl results primarily from the pathogen's loss of energy-linked respiration due to destruction of cellular electron transport components and the adenine nucleotide pool. See KNOX, W. E., STUMPF, P. K., GREEN, D. E., and AUERBACH, V. H., 1948, The inhibition of sulfhydryl enzymes as the basis of the bacterial action of chlorine. J. Bacteriol. 55(4): 451-458 ("Knox"). Hypochlorous acid's effectiveness as a disinfectant is in-part due to its ability to rapidly penetrate through a microorganism's cell membrane. See BUNCE, N. J., 1990, Environmental Chemistry. Wuerz Publishing, Ltd. ("Bunce").

HOCl vapor, generated by a method described in Canadian Patent 997,532, can be passed over the surface and vacuum-infiltrated into the intercellular spaces of stored plant matter present in a hypobaric intermodal container in order to kill bacteria and fungi. Immediately after the commodity has been cooled, packed in boxes, placed in an LP intermodal container, and the container has been evacuated, it can be vented with atmospheric air containing hypochlorous acid vapor generated by passing atmospheric air through a hypochlorite solution. Venting can be completed in 30 minutes, without damaging plant matter, and the chamber may be re-evacuated immediately thereafter, or a short time later, to begin hypobaric transportation in the VacuFresh container. After transport has been completed, the chamber can again be vented with air containing HOCl vapor before the commodity is removed for distribution. During venting, the HOCl vapor concentration within and around the plant matter progressively approaches the atmospheric concentration of HOCl vapor in the venting air. Simultaneously, the HOCl in the chamber is decreased by contact with the commodity and boxes. By adjusting the pH and sodium hypochlorite concentration of the solution, and varying the concentrations of sodium hypochlorite (7.5% commercial NaOCl solution is available) and carbonate/bicarbonate buffer, the solution can be made to yield between 0.5 and 26 ppm (µl/l vol:vol) of hypochlorous acid vapor. A high enough HOCl vapor concentration can be maintained for long enough to kill up to 100% of bacteria, molds and virus's present on and within the stored plant matter, without damaging it.

After venting with HOCl containing air, residual chlorinated vapor can be flushed from a VacuFresh intermodal container by cracking the door open and pressurizing the container's pneumatic air horn at 80 psig with an external oil-free air-compressor. This exhausts two air-changes per minute (1520 cfm) and cleanses 99% of the HOCl from the container's atmosphere within 5 minutes. During and after venting, HOCl is prevented from entering the suction port of the vacuum regulator by an upstream solenoid valve, for example a Sizto Tech Corporation normally open ozone-resistant stainless steel model 2-SO500-2 with a 24 VDC coil and viton seals, rated for vacuum. Likewise, the vacuum regulator's pressure sensing port (FIG. 3) can be sealed by a normally open solenoid valve, such as an ozone resistant 2-SO012-1/4A with a 24 VDC coil and NBR seals, rated for vacuum. These solenoid valves are not energized and are open whenever the vacuum pump is powered, and are energized and closed whenever the vacuum pump is OFF and the container is powered.

Hypochlorous acid (HOCl) is at least 100 times more effective than $OCl^{-1}$ as a sanitizer and is responsible for most of the germicidal effect of active chlorine ($Cl^+$) both in air and chlorinated water. HOCl is a weak acid ($K_A=2.9\times10^{-8}$M):

$$HOCl \rightleftharpoons H^+ + ClO^-$$ Equation 8

Free available chlorine refers to the hypochlorous acid form of chlorine in a solution. Total free chlorine is the sum of associated hypochlorous acid (HOCl) and hypochlorite ion ($OCl^-$) present in the solution. All free chlorine would be in the form of hypochlorous acid if the pH was low enough. Above pH 8.0 the amount of available chlorine present in the solution, and the concentration of HOCl vapor in air that has passed through the solution and equilibrated with it, decreases 10-fold for a 1 unit pH increase:

$$HOCl=(H^+)(OCl^-)/K_A'$$ Equation 9 where $K_A'$ is the association constant for HOCl corrected for salting out. The dissolved chlorine gas ($Cl_2$) content in the solution decreases 100-fold per unit increase in pH:

$$Cl_2=(H^+)^2(Cl^-)(OCl^-)/K_B'K_A'$$ Equation 10 where $K_B'$ is the association constant for $Cl_2$ corrected for salting out.

Usually pH 6 to 7 chlorinated water is used as a liquid disinfectant because in that pH range essentially all chlorine in the solution is present as free-associated HOCl, and very little toxic $Cl_2$ gas or chlorine dioxide is present. U.S. patent application 20080003171 entitled "Microbial control using hypochlorous acid vapor" claims that HOCl is 'ineffective' above pH 8.5. See SMITH W. L., ARNT, L., BROMBERG, S. E., DANI, N., ELOSAYED, M. Y., FOLAND, L. D., MELLEL D., ROBLES, J., and VEIRA, K. L. (2008). Microbial control using hypochlorous acid vapor. U.S. Patent Publication No. 20080003171A1 application ("Smith). This is misleading because the HOCl is effective but very little is present at that pH.

Associated hypochorous acid is volatile, unlike $OCl^{-1}$. HOCl vapor has not been used as a microbiocidal fumigant with fresh fruits, vegetables, or cut flowers because it is unstable and difficult to produce on-site at the precise low ppm vapor concentration needed to kill microorganisms without simultaneously damaging the host plant matter (See LISTER, B. W. (Can. Pat. No. 1952) The decomposition of hypochlorous acid. Can. J. Chem. 30: 879-889). Burg (Can. Pat. 997,552) used the reaction between atmospheric $CO_2$ and a NaOCl solution to continuously generate hypochlorous acid vapor into air-changes passing through laboratory systems, and determined the HOCl vapor concentration that killed various bacteria and fungi without damaging the host plant matter. HOCl vapor was continuously generated by adding between 0.1 to 2.5% alkaline sodium hypochlorite to water contained in a laboratory storage system's humidifier, in some instances buffering the mixture with $Na^+$ or $K^+$ salts of carbonate or bicarbonate, or titrating the solution down to a pH higher than 8.5 with HCl or nitric acid. Evaporated humidification water was continuously replaced, but the initial hypochlorite and additives were so concentrated that they did not need to be replenished for several months. Bubbling atmospheric $CO_2$ (0.036%) through the humidification solution generated 0.35 to 10 ppm (μl/l vol:vol) hypochlorous acid vapor, measured colorimetrically by passing the chlorinated air-change through o-tolidene reagent. The HOCl vapor was 100% effective in preventing mold and bacterial growth at both atmospheric pressure and a sub-atmospheric pressure.

As rapidly as hypochlorous acid is lost from a NaOCl solution it is regenerated from the large excess reservoir of hypochlorite ion present. After equilibration with $CO_2$ present in the incoming air-change has occurred, the solution's pH stabilizes between 8.5 and 9.3 due to the buffering action of hypochlorous acid, which has a $pK_A$ of 7.54. To preserve electric neutrality in a hypochlorite solution that has equilibrated with incoming $CO_2$, the concentrations of the various ionic components must give rise to a total electric charge carried by cations that is equal and opposite to that carried by anions:

$$(Na^+)+(H^+)=K_1'q'(pCO_2)/(H^+)+2K_1'K_2'q'(pCO_2)/(H^+)^2C_AK_A'/[(H^+)+K_A]+(Cl^-)+K_W'/(H^+)$$ Equation 11 where $K_1'$ is the dissociation constant for carbonic acid, corrected for salting out according to the expressions $pK_1=pK-0.5\omega^{1/2}$ and $\omega=\frac{1}{2}\Sigma m_1 \Sigma_1^2$; $m_1$ is the molality of the ion and $Z_1$ its valence; $K_2'$ is the dissociation constant for bicarbonate corrected for salting out according to the expression $pK_2=pK_2-1.1\omega^{1/2}$; q' is the Henry's Law constant for $CO_2$ corrected for salting out according to the expression log(Q/Q')=0.11ω, where q=Q'/760; $pCO_2$ is the partial pressure of $CO_2$ in air (mm Hg); $C_A$ is the hypochlorite concentration ($C_A=OCl^{-1}+HOCl$); $K_A'$ is the dissociation constant of hypochlorous acid corrected for salting out; and $K_W'$ is the dissociation constant of water corrected for salting out. This equation predicts, and tests verified, that sodium hypochlorite solutions ranging in concentration from 0.1 to 2.6% (weight/volume) equilibrate with atmospheric [$CO_2$] at pH values in the range 8.5 to 9, and that when the [$CO_2$] is increased or hypochlorite concentration decreased, the equilibrium pH is lower. When $Na^+$ or $K^+$ salts of bicarbonate or carbonate are added to a hypochlorite solution, a higher pH is maintained, the hypochlorite reservoir depletes more slowly, and a lower concentration of hypochlorous acid vapor is generated. The HOCl distributes itself between the solution's gas and liquid phases in accord with Henry's Law ($K_H°=730$ mol/kg*bar, see LOOMIS, A. G., 1928. Solubilities of gases in water. In E. W. Washburn, C. J. West, N. E. Dorsey, F. R. Bichowsky, and A. Klemenc, editors, International Critical Tables of Numerical Data, Physics, Chemistry and Technology, Vol. III, pages 255-261. McGraw-Hill, Inc., and the air change continuously entrains a low concentration of the associated, non-ionized HOCl. Simultaneously, additional volatilizable associated HOCl is created from the reservoir of unassociated chlorine-containing ions in a self-sustaining chemical reaction. $Cl^-$ is the only significant residue left on plant matter treated with HOCl vapor. The solution continues as a reservoir of associated HOCl over a long period of time with only a slight consumption of the hypochlorite ion. Evaporated water must be replaced, but the initial reservoir of hypochlorite and additives is so concentrated that it does not need to be replenished for weeks or months. As rapidly as hypochlorous acid vapor is lost from the solution it is regenerated from the large excess of hypochlorite ion present.

The ability to evolve HOCl vapor at a nearly constant rate for long periods of time is due to feedback controls that govern the availability of associated HOCl for entrainment in the carrier air. The pH of the aqueous solution is maintained sufficiently alkaline and above that corresponding to the $pK_A$ of HOCl to continuously provide a trace amount of associated HOCl while inhibiting its loss by light enhanced reactions and the generation of chlorine gas or chlorine dioxide. Below pH 8.5, hypochlorite solutions become unstable because the associated HOCl is converted to $O_2$, HCl and $HClO_3$. Since HCl and $HClO_3$ are stronger acids than HOCl these reactions acidify the solution even though a certain amount of acid is lost as HOCl vapor. When the pH decreases the percentage of total available chlorine present as HOCl increases and therefore the rate of acidifying reactions also increases. This autocatalytic sequence, which is initiated below pH 8.5, results in the total decomposition of the solution to yield HCl, $HClO_3$, $O_2$ and HOCl vapor. Below pH 6 the solution rapidly decomposes, generating large amounts of toxic chlorine gas.

Continuous fumigation with between 0.1 to 5.9 ppm HOCl vapor was 100% effective in killing decay organisms without damaging the host commodity. The HOCl vapor was 100% effective in preventing decay from developing on tomatoes, bananas, peppers, cucumbers, green beans, grapes, oranges, grapefruit, limes, avocados, mangos, lettuce, strawberries, and pineapples for storage times varying from 14 to 150 days (EP20100267144; Burg, 2004). Without HOCl treatment control plant matter developed 33 to 100% decay in a much shorter time. Growth of *Colletotrichum gloeosporioides, Thielaviopsis paradoxa, Verticillium theobromeae, Botrytis cinerea, Sclerotinia sclerotiorum*, and *Gloeosporium musarum* cultures on agar medium at 20° C. was prevented by 0.5 to 1 ppm HOCl vapor.

Hypochlorous acid vapor is a strong oxidizing agent that corrodes many materials, but not 5000 and 6000 series aluminum, or 316 stainless steel. The only material present in the interior of the VacuFresh hypobaric intermodal container that reacts with HOCl upstream of the vacuum regulator and vacuum pump, is the neoprene door gasket. This should be replaced with an equivalent viton door gasket, which is unaffected by hypochlorous acid vapor.

Although hypochlorous acid is thermodynamically unstable, it is much more stable than other hypohalite acids, and unlike the others can be distilled and recovered without extensive decomposition. This allows HOCl vapor to persist in air for long enough to control microbial development. HOCl vapor also decomposes when it contacts cardboard boxes or the commodity's surface, and at atmospheric pressure this causes the HOCl vapor concentration within boxes to be much lower than it is in the storage air. Lowering the pressure to 10 mm Hg enhances the diffusion of HOCl vapor 76-fold [FIG. 5A], and this should decrease the HOCl gradient between the storage atmosphere and interior of a box. In a 20 ft. Fruehauf hypobaric intermodal container operating at 3° C. and 160 mm Hg, 2.5 μl/l of hypochlorous acid vapor was measured in the storage atmosphere and 1.0 to 1.5 μl/l inside cardboard boxes containing Shasta strawberries.

The EPA considers HOCl to be non-toxic to human and animal tissues and non-deleterious to the environment. The FDA has approved the use of high aqueous concentrations of HOCl in contact with fresh foods and cut-flowers (Smith).

Turning to the figures, FIG. 1 depicts a diagram of a hypobaric warehouse in which the pressure is controlled by a vacuum regulator, the hypobaric warehouse comprising boiler A, boiler water B, boiler water level controller C, thermal mass air flow controller with remote digital readout D, wattage controlled boiler heater E, reverse osmosis+deionizing cartridge water purifier F, rotary oil-sealed air cooled gas ballasted vacuum pumps G, absolute vacuum regulator H, ball valves J, finned heat exchange tube K, vacuum regulator pressure sensing line (external register) L, inlet air duct M with duct holes sized and spaced to provide even longitudinal flow, exhaust duct N with duct holes sized and spaced to provide 5% pressure drop between the hypobaric warehouse and rotary oil-sealed air cooled gas ballasted vacuum pumps G and temperature controlled space P (at about 20 to 25° C.).

FIG. 2 depicts a diagram of a hypobaric intermodal container in which the pressure is controlled by a vacuum regulator, comprising ethylene glycol heat exchange fluid A in surge tank, vented surge tank cap B, temperature controlled equipment compartment C (held at about 20 to 25° C.), spirally wrapped rectangular cooling and reinforcing extrusion D, front aluminum head (door) E, neoprene door seal F that seats against an aluminum triangular cooling and reinforcing extrusion D, 5056-T6 marine aluminum circular vacuum tank G suspended between end frames by means of aluminum/fiberglass/T-1 steel mounting clips huck-bolted together and welded to the tank and end frames, floor duct H containing bottom holes sized and spaced to provide uniform uptake along the entire duct length with less than a 5% pressure drop between atmosphere in surge tank A and absolute vacuum regulator N, pneumatic air horn J discharging into longitudinal duct K, longitudinal duct K carrying pneumatic air horn discharge to front aluminum head E, cooling/heating coil L on front aluminum head E, thermal mass flow controller M with remote digital readout, absolute vacuum regulator N, rotary gas ballasted air cooled oil sealed vacuum pump P and rear aluminum head Q cooled by ethylene glycol A in surge tank.

FIG. 3 depicts absolute vacuum regulator (Fisher Y696VRM) computer controlled by a Clippard EVP series proportional solenoid control valve responsive to an absolute pressure transducer, or manually controlled with an LJ model 329 self-relieving vacuum controller, comprising closing cap A, spring adjusting nut B, blocked throat C, O-ring seal on valve stem D, lever assembly E, diaphragm F, orifice to make EVP solenoid valve (H) self-relieving G (not required with LJ self relieving model 329 vacuum controller), EVP proportional control solenoid valve H (can be computer controlled) or LJ self relieving 329 vacuum breaker (manually controlled) and external register J.

FIG. 4 depicts the air temperature, dew point temperature, RH, and the temperature of roses and cardboard boxes during storage in a hypobaric chamber in non-waxed cardboard boxes according to one embodiment of the invention. Arrows indicate times when the chamber was vented to atmospheric pressure for 2 to 4 hours to remove partial loads. The roses tolerated the extra water loss caused by the release of latent heat of water condensation during the initial 2 weeks. Vase life of the stored roses was only reduced by one day during the 35 day storage, whereas control roses stored in a high humidity refrigerated cold-room lost storage and vase-life so rapidly that they became unsalable after 5 to 7 days.

FIG. 5A depicts the effect of pressure on the air/water vapor binary diffusion coefficient (D).

FIG. 5B depicts the relative humidity at various operational pressures inside NASA's experimental 'Mars' hypobaric growth chamber and in a VacuFresh hypobaric intermodal container. Operating conditions: leak rate=27.8 mm Hg/h in the NASA chamber, 0.3 mm Hg/h in the VacuFresh intermodal container; ambient condition=25° C., 50% RH; flowing one saturated 0° C. low pressure air-change per hour; chamber temperature=0° C.

FIG. 6 depicts VacuFresh equipment according to one embodiment of the invention, comprising copper fin and tube radiator 1; heat exchanger 2; cable 3 to scroll compressor; filter-drier 4; pressure controller 5; finbar heaters 6; receiver 7; air filter 8; injection expansion valve 9; brazed plate heat exchanger 10; vacuum pump oil filter 11; pressure sensing probe 12; line 13 from vacuum regulator 21 to pressure sensing probe 12; radiator fans 14; solenoid valve 15; vacuum pump 16; fork-lift slots 17; glycol tank connection 18; glycol supply 19; unloader solenoid valve 20; vacuum regulator 21; glycol pump 22; thermostatic valve 23; R-134a scroll compressor 24; economizer HX 25; silicone heating strips 26; cable storage 27; micro channel condenser coil 28; reinforcing gusset 29; axial condenser fan 30; spin-on air filter 31; low ΔP flow meter+valve 32; heat exchanger 33; end frame 34; corner casting 35; discharge pressure regulator 36; transformer 37; check valve 38; electronic expansion valve 39; solenoid valve 40; emergency glycol fill 41; surge tank sight glass 42; surge tank drain valve 43; glycol drain valve 44; Abs. pressure transducer 45; vacuum pump 46; flow controller 47; oil separator 48; oil-return solenoid valve 49; electric component box 50; glycol temperature probe 51; digital compressor controller 52; and vacuum pump suction line 53.

The foregoing embodiments have been presented for the purpose of illustration and description only and are not to be construed as limiting the scope of the invention in any way. The scope of the invention is to be determined from the claims appended hereto.

I claim:

1. A method of preserving respiring plant matter comprising:
    placing respiring plant matter disposed in one or more storage boxes in a vacuum chamber, the vacuum chamber comprising walls enclosing a storage space, whereby the respiring plant matter produces respiration products including transpired moisture which contribute to a humidified air environment within the storage space;
    controlling the temperature in the vacuum chamber with a refrigeration unit so that the walls of the vacuum chamber have a temperature between about 0° C. and +16° C.;
    simultaneously evacuating the vacuum chamber with a vacuum pump to remove a portion of the air, metabolic products and transpired moisture comprising the humidified air environment from the storage space;
    simultaneously controlling the pressure within the vacuum chamber by use of a vacuum regulator which senses the pressure within the storage space through an external register connected to the storage space, wherein the vacuum regulator operates at a substantially higher temperature than the temperature within the vacuum chamber;
    continuously introducing air into the vacuum chamber in an amount sufficient to satisfy the respiratory oxygen needs of the respiring plant matter therein and that further is sufficient to prevent the respiring plant matter from suffering low $O_2$ injury at the sub-atmospheric pressure maintained within the storage space; and
    correlating the controlled temperature within the storage space with (i) the controlled pressure within the storage space, (ii) the regulated air, metabolic products and transpired moisture evacuation rate, and (iii) the regulated air intake rate based on the respiring plant matter's $O_2$ consumption and heat production rates, the weight of respiring plant matter placed within the vacuum chamber relative to the volume of the storage space, and the rate at which saturated sub-atmospheric pressure air flows from the vacuum chamber to the vacuum regulator.

2. The method of claim 1 wherein the air introduced into the vacuum chamber is introduced into and re-circulated through the vacuum chamber through a pneumatic air horn, and the sub-atmospheric pressure air in the vacuum chamber is saturated exclusively by transpired water evaporated from the respiring plant matter by respiratory heat, wherein air is introduced into the vacuum chamber through the pneumatic air horn at a rate providing an amount of $O_2$ sufficient to prevent low-$O_2$ damage to the respiring plant matter.

3. The method of claim 2 wherein the vacuum regulator regulates the rate at which incoming air is introduced into and re-circulated through the vacuum chamber, wherein further the atmosphere within the vacuum chamber is maintained between saturated and less than super-saturated in response to a progressive decrease in the quantity of respiratory heat produced by the respiring plant matter.

4. The method of claim 2 wherein the storage boxes comprise a material of construction which does not adsorb and condense a significant amount of water vapor and therefore releases little or no latent heat of water condensation into the storage boxes, wherein further the material of construction does not absorb liquid water and does not lose structural strength when the storage boxes are contacted with liquid water.

5. The method of claim 4 wherein the air introduced into the vacuum chamber is saturated by contact with heated water at the vacuum chamber's temperature and operational sub-atmospheric pressure prior to introduction into the vacuum chamber at a rate that supplies $O_2$ sufficient to prevent low-$O_2$ damage to the respiring plant matter.

6. The method of claim 4, wherein the correlated conditions within the storage space initially are adjusted such that the vacuum pump initially operates at full capacity.

7. The method of claim 4, wherein the walls of the vacuum chamber comprise aluminum, wherein further the aluminum walls are not painted or anodized.

8. The method of claim 1 wherein the vacuum regulator and vacuum pump are operated at approximately 20 to 25° C.

9. The method of claim 1 wherein the temperature of the respiring plant matter is maintained at a temperature above the temperature of the walls of the storage space and the sub-atmospheric pressure atmosphere in the storage space by insertion of a plastic slip sheet in each storage box, thereby preventing the respiring plant matter from acquiring environmental heat and evapo-transpiring more water than its respiratory heat can vaporize.

10. The method of claim 1 wherein the isolated vacuum chamber increases in pressure at a rate of less than about 1 mm Hg per hour.

11. The method of claim 1 wherein the controlled and correlated conditions are adjusted to provide an $O_2$ concentration of at least about 0.08% inside the vacuum chamber by a vacuum regulator operating at about 20 to 25° C.

12. The method of claim 1 wherein the rate at which sub-atmospheric pressure air enters the vacuum chamber is controlled and measured by a thermal mass flow controller, and the flow control device is powered after the vacuum pump has evacuated the storage space to a predefined storage pressure.

13. The method of claim 1 wherein stainless steel ozone resistant vacuum solenoid valves are installed upstream of the suction port of the vacuum regulator and the external register to isolate the vacuum regulator and vacuum pump if the vacuum pump is turned off after the vacuum pump has evacuated the storage space, wherein the solenoid valves are optionally in the open position when the vacuum pump is operating.

14. The method of claim 13 wherein after the vacuum regulator and vacuum pump are isolated, the evacuated vacuum chamber is vented with air containing between 0.5 and 25 ppm of hypochlorous acid vapor generated in an external corrosion resistant tank, wherein bacteria and molds present on the surface and within the intercellular air spaces of the respiring plant matter present in the storage boxes within the vacuum chamber are fumigated and killed by the hypochlorous acid vapor.

15. A storage apparatus for preserving fresh respiring plant matter comprising:
- a vacuum chamber comprising four walls defining a storage space and a door providing access to the storage space, wherein the storage space is constructed and configured to receive fresh respiring plant matter therein for preservation;
- a refrigeration unit constructed and arranged in heat exchange relation to the walls of the vacuum chamber to maintain the temperature of the vacuum chamber between about 0° C. and +16° C.;
- a vacuum pump configured to evacuate the vacuum chamber,
- a pneumatic air horn having supply jets for mixing the air within the vacuum chamber, wherein the pneumatic air horn is powered by added atmospheric air as it enters the vacuum chamber through the supply jets of the pneumatic air horn, wherein further the pneumatic air horn circulates air and respiration products including moisture from the fresh respiring plant matter stored within the vacuum chamber;
- a conduit in communication with the collar of the pneumatic air horn through which 20 to 25° C. atmospheric pressure temperature-controlled air drawn from the vacuum pump cabinet is introduced into the jets of the pneumatic air horn and therefore powers the pneumatic air horn;
- a longitudinal duct discharging at the door of the storage space into which the pneumatic air horn discharges, thereby carrying expanded air emitted from the jets of the pneumatic air horn and additional chamber air entrapped responsive to air emitted from the jets of the pneumatic air horn, wherein the entrapped air comprises respiration products including moisture from the respiring plant matter stored within the vacuum chamber; and
- a vacuum regulator operating at approximately 20 to 25° C., arranged in cooperative relation to the vacuum chamber to control the pressure within the vacuum chamber at a pressure no lower than about 8.0 mm HgA when plant matter is being stored or transported.

16. The storage apparatus of claim 15 wherein the vacuum chamber comprises a 5000 series aluminum intermodal circular beam tank, and the tank is suspended between conventional iron or steel intermodal container end frames by supporting clips comprising gusseted aluminum rectangular plates welded to the surface of each end of the tank to form square aluminum tank ends, which tank ends are huck bolted to the tank through fiberglass insulating panels and low thermal conductivity T-1 steel panels, wherein the T-1 steel panels are welded at one edge to the tank ends, thereby supporting the tank between the end frames with minimal heat intrusion from ambient air.

17. The storage apparatus of claim 15 wherein the leak rate of the evacuated vacuum chamber is less than about 1 mm Hg per hour.

18. The storage apparatus of claim 17 wherein a rectangular aluminum extrusion is spirally wrapped and welded to the tank's surface at a pitch providing sufficient structural strength needed to operate the tank at a full internal vacuum with in-transit loading and an adequate safety factor.

19. The storage apparatus of claim 18 wherein a glycol coolant is continuously flowed through the spiral wrapped rectangular aluminum extrusion at a rate determined in part by the rectangular aluminum extrusion's hydraulic radius to control the surface temperature between the two ends of the tank at a temperature differential of about 0.2° C. at an ambient air temperature as high as 130°.

20. The storage apparatus of claim 19, wherein the evacuated vacuum chamber is vented with atmospheric air containing 0.3 to 25 ppm of hypochlorous acid vapor for at least 30 minutes to kill molds and bacteria present in and on the surface of fresh respiring plant matter loaded in the storage boxes, where the hypochlorous acid vapor is produced by bubbling atmospheric air containing a normal content of approx. 0.039% carbon dioxide through a 0.1 to 7.5% sodium or potassium hypochlorite solution, wherein the sodium or potassium hypochlorite solution is optionally augmented with additives comprising a sodium or potassium carbonate/bicarbonate buffer, at a pH higher than 8.5, and the sodium or potassium hypochlorite solution is contained in an external vacuum tank constructed of a corrosion resistant material comprising 5000 series aluminum, 316 stainless steel, or fiberglass.

* * * * *